US010761215B2

United States Patent
Kido et al.

(10) Patent No.: US 10,761,215 B2
(45) Date of Patent: Sep. 1, 2020

(54) POSITIONING DEVICE AND POSITIONING METHOD

(71) Applicant: Mitsubishi Electric Corporation, Tokyo (JP)

(72) Inventors: Masashi Kido, Tokyo (JP); Tadatomi Ishigami, Tokyo (JP); Takashi Irie, Tokyo (JP); Masatoshi Fujii, Tokyo (JP); Kohei Fujimoto, Tokyo (JP); Ryusuke Kinoshita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 207 days.

(21) Appl. No.: 16/073,695

(22) PCT Filed: Mar. 3, 2017

(86) PCT No.: PCT/JP2017/008522
§ 371 (c)(1),
(2) Date: Jul. 27, 2018

(87) PCT Pub. No.: WO2017/154779
PCT Pub. Date: Sep. 14, 2017

(65) Prior Publication Data
US 2019/0033465 A1 Jan. 31, 2019

(30) Foreign Application Priority Data
Mar. 9, 2016 (WO) .................. PCT/JP2016/057337

(51) Int. Cl.
G01S 19/40 (2010.01)
G01S 19/07 (2010.01)
(Continued)

(52) U.S. Cl.
CPC .............. *G01S 19/40* (2013.01); *G01S 19/07* (2013.01); *G01S 19/22* (2013.01); *G01S 5/021* (2013.01); *G01S 19/05* (2013.01); *G01S 19/42* (2013.01)

(58) Field of Classification Search
CPC .......... G01S 19/11; G01S 19/46; G01S 19/42; G01S 19/48; G01S 19/07; G01S 19/45;
(Continued)

(56) References Cited

U.S. PATENT DOCUMENTS 6,480,787 B2 * 11/2002 Yoshikawa ........... G01S 5/0072
342/357.24
8,599,065 B2 * 12/2013 Rodriguez .............. G01S 19/07
342/357.46
(Continued)

FOREIGN PATENT DOCUMENTS

JP 3321096 B2 9/2002
JP 3559142 B2 8/2004
(Continued)

OTHER PUBLICATIONS

International Search Report (PCT/ISA/210) issued in PCT/JP2017/008522, dated May 9, 2017.

Primary Examiner — Olumide Ajibade Akonai
(74) Attorney, Agent, or Firm — Birch, Stewart, Kolasch & Birch, LLP

(57) ABSTRACT

A code positioning part calculates a position of a subject vehicle and a receiver clock based on an orbit of a GNSS satellite in which an error indicated by a positioning reinforcing signal is corrected and a first corrected pseudorange being a pseudorange of the GNSS satellite in which an error indicated by the positioning reinforcing signal is corrected. A receiver clock bias error correction part determines a difference between a two-point range between a position of each of a plurality of GNSS satellites and the position of the (Continued)

subject vehicle and the first corrected pseudorange as an unknown error, and determines a receiver clock bias error of the pseudorange based on the unknown error. A code positioning correction part recalculates the position of the subject vehicle, using a second corrected pseudorange that is obtained by correcting the first corrected pseudorange using the receiver clock bias error.

17 Claims, 26 Drawing Sheets

(51) Int. Cl.
  *G01S 19/22* (2010.01)
  *G01S 19/05* (2010.01)
  *G01S 5/02* (2010.01)
  *G01S 19/42* (2010.01)

(58) Field of Classification Search
  CPC .......... G01S 19/05; G01S 19/06; G01S 19/10; G01S 5/021; G01S 5/145; G01S 19/22; G01S 19/40; G01S 19/41; G01S 19/235; G01S 19/30; H04W 56/005
  See application file for complete search history.

(56) References Cited

U.S. PATENT DOCUMENTS

| | | |
|---|---|---|
| 9,223,029 B2 | 12/2015 | Iwase |
| 2012/0050097 A1* | 3/2012 | Zhang ................... G01S 19/423 342/357.26 |
| 2013/0027246 A1* | 1/2013 | Hadef ..................... G01S 19/40 342/357.25 |
| 2015/0138015 A1 | 5/2015 | Ishigami et al. |
| 2015/0145722 A1* | 5/2015 | Johnson .................. G01S 19/07 342/357.44 |
| 2015/0149073 A1 | 5/2015 | Ishigami et al. |
| 2015/0168557 A1* | 6/2015 | Zou ....................... G01S 19/425 342/357.42 |
| 2018/0252818 A1* | 9/2018 | Sato ........................ G01S 19/08 |

FOREIGN PATENT DOCUMENTS

| | | |
|---|---|---|
| JP | 3568768 B2 | 9/2004 |
| JP | 3727489 B2 | 12/2005 |
| JP | 3875714 B2 | 1/2007 |
| JP | 4988028 B2 | 8/2012 |
| JP | 5078082 B2 | 11/2012 |
| JP | 5590010 B2 | 9/2014 |
| JP | 2014-206502 A | 10/2014 |
| JP | 5606656 B2 | 10/2014 |
| WO | WO 2014/002211 A1 | 1/2014 |

* cited by examiner

F I G. 2 0
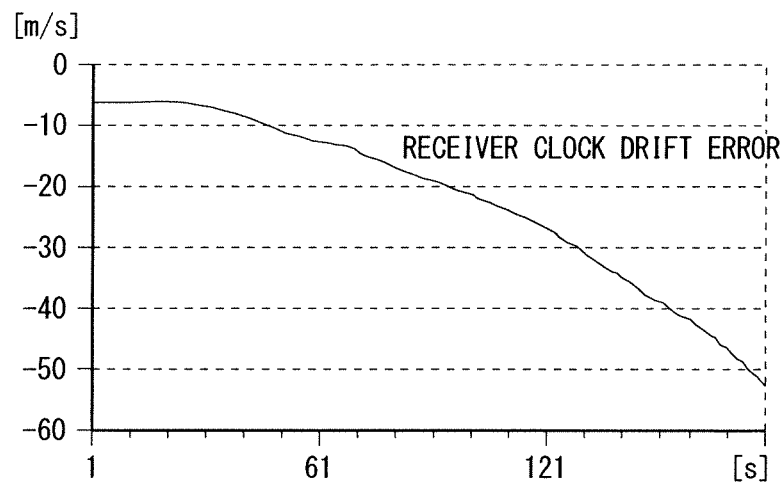
F I G. 2 1
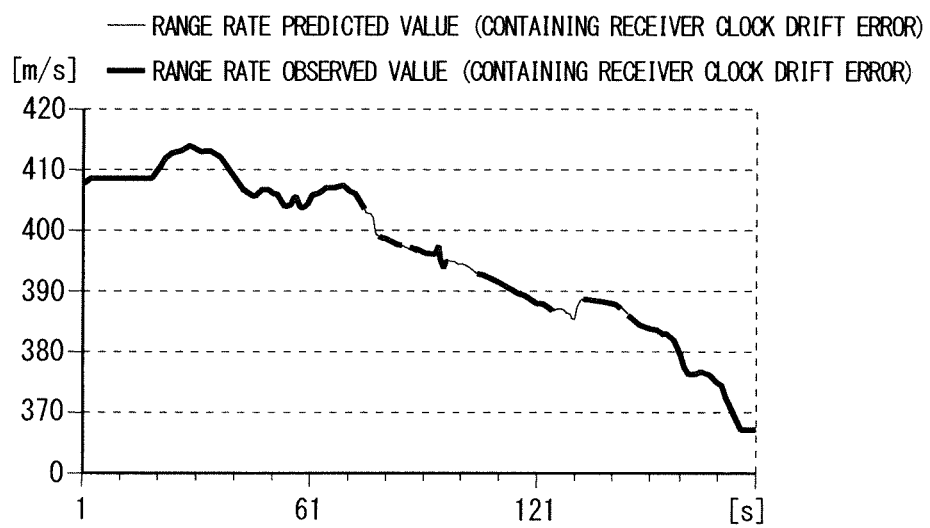

F I G. 2 2
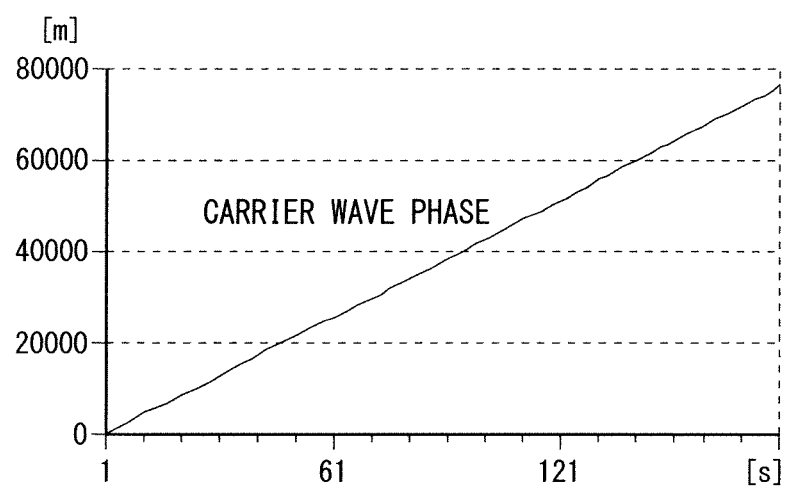

```
....  CONFIRMED COMBINATION OF
      GNSS SATELLITES
```

```
....  CONFIRMED COMBINATION OF
      GNSS SATELLITES
```

○ SUBJECT VEHICLE POSITION POSITIONED
   BY POSITIONING-USE SATELLITE BEFORE CHANGE

● SUBJECT VEHICLE POSITION POSITIONED
   BY POSITIONING-USE SATELLITE AFTER CHANGE

▦ TRAVELING LANE

POSITIONING DEVICE AND POSITIONING METHOD

TECHNICAL FIELD

The present invention relates to a positioning device (locator device) that conducts positioning of lane-level precision with use of a global navigation satellite system (GNSS) receiver or the like, and to a positioning method.

BACKGROUND ART

For example, as a positioning device for measuring the position of a subject vehicle, a car navigation device or the like includes a subject vehicle position estimation device. The subject vehicle position estimation device of a car navigation device specifies a road in which the subject vehicle is traveling through map matching processing using information of an absolute position of the subject vehicle obtained using a GNSS receiver, information of a relative position (positional change) of the subject vehicle observed by an autonomous sensor, and map information containing data of a road network.

A subject vehicle position estimation device of the related art uses map information in which each road is represented as one link. Hence, even when highly precise positioning capable of specifying a traffic lane (lane) in which a subject vehicle is traveling is conducted, information of a lane is not reflected in the results of the map matching processing. Therefore, positioning precision of a subject vehicle position has sufficed to be a road-level precision (positioning precision of several meters). However, as a result of enhancement in performance of a car navigation device, higher accuracy in map information, development of automated driving technologies, and the like, there have been proposed technologies of specifying a subject vehicle position with higher precision (e.g., Patent Documents 1 to 3 below).

PRIOR ART DOCUMENTS

Patent Documents

Patent Document 1: Japanese Patent No. 5078082
Patent Document 2: Japanese Patent No. 5590010
Patent Document 3: Japanese Patent Application Laid-Open No. 2014-206502

SUMMARY

Problem to be Solved by the Invention

For example, in the field of land surveying, there is a highly precise positioning method (carrier wave phase positioning method) implemented by measuring a carrier wave phase of a positioning signal from a GNSS receiver. A carrier wave phase positioning method requires a dual-frequency GNSS receiver including a high-precision clock, thus increasing costs. On the other hand, a related-art code positioning method implemented in a subject vehicle position estimation device may use a low-cost single-frequency GNSS receiver. However, a clock of such a GNSS receiver has low precision (approximately 1 μsec in a case of a GNSS receiver for a vehicle), and hence a bias error of a clock of a GNSS receiver (receiver clock bias error) needs to be corrected with high precision in order to obtain high positioning precision.

The present invention has been made in order to solve the problems as above, and has an object to provide a positioning device capable of correcting a positioning error caused by a receiver clock bias error of a GNSS receiver with high precision.

Means to Solve the Problem

A positioning device according to the present invention is a positioning device for measuring a position of a mobile object. The positioning device includes a code positioning part for calculating a position of the mobile object and a receiver clock based on an orbit of a GNSS satellite in which an error indicated by a positioning reinforcing signal is corrected and a first corrected pseudorange being a pseudorange of the GNSS satellite in which an error indicated by the positioning reinforcing signal is corrected, a receiver clock bias error correction part for determining, concerning a plurality of GNSS satellites affected by multipath to a smaller extent than a predetermined value, a difference between a two-point range between a position of each of the plurality of GNSS satellites and the position of the mobile object and the first corrected pseudorange as an unknown error, and determining a receiver clock bias error of the pseudorange based on the unknown error, and a code positioning correction part for recalculating the position of the mobile object, using a second corrected pseudorange that is obtained by correcting the first corrected pseudorange using the receiver clock bias error calculated by the receiver clock bias error correction part.

Effects of the Invention

With the positioning device according to the present invention, a positioning error caused by a receiver clock bias error of a GNSS receiver can be corrected with high precision. Therefore, a system can be constructed using a low-cost GNSS receiver.

The object, features, aspects, and advantages of the present invention will become more obvious with the following detailed description and the attached drawings.

BRIEF DESCRIPTION OF DRAWINGS

FIG. 20 is a graph illustrating operation of the locator device according to the third embodiment.

FIG. 21 is a graph illustrating operation of the locator device according to the third embodiment.

FIG. 22 is a graph illustrating operation of the locator device according to the third embodiment.

DESCRIPTION OF EMBODIMENTS

First Embodiment

Figure 1:
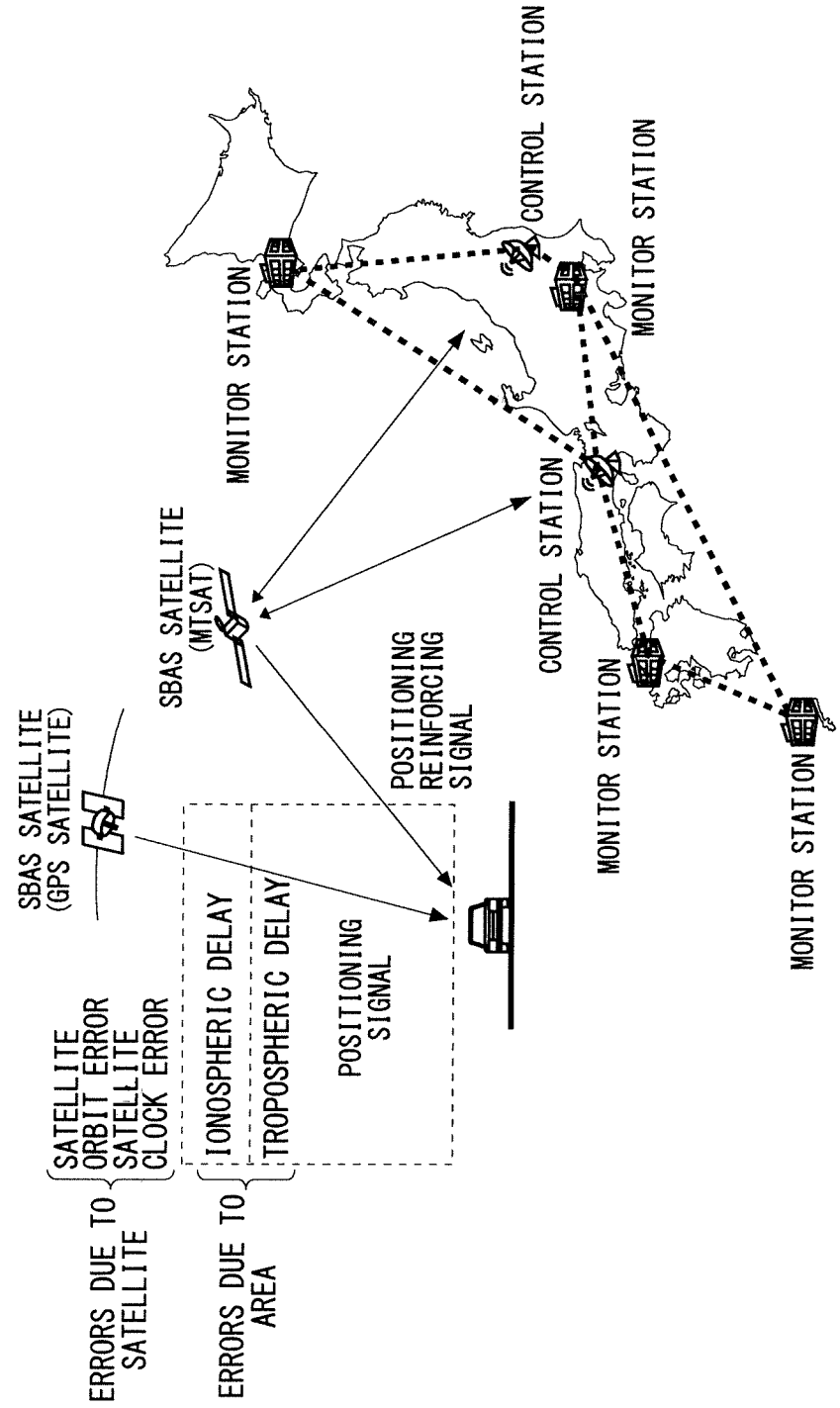
FIG. 1 is a diagram illustrating a configuration of MSAS as an example of a satellite-based augmentation system to which the present invention is applied.

FIG. 1 is a diagram illustrating a configuration of an MTSAT satellite-based augmentation system (MSAS) being a satellite-based augmentation system (SBAS; satellite-based augmentation system) in Japan. In MSAS, a positioning reinforcing signal containing correction information (satellite clock error, satellite orbit error, ionospheric propagation delay, and tropospheric propagation delay) of a positioning signal that is broadcast by the GPS satellite being a GNSS satellite is broadcast from a multi-functional transport satellite (MTSAT) being a geostationary satellite (SBAS satellite) toward an aircraft. MSAS is a service for aircrafts whose service areas belong to a flight information region (FIR) of Fukuoka, which is specified by the International Civil Aviation Organization (ICAO), but is also available for others besides aircrafts.

In the embodiments described below, examples in which the present invention is applied to MSAS are given. However, the present invention is not to be limited to the application to MSAS, and is widely applicable to other satellite-based augmentation systems as well.

Figure 2:
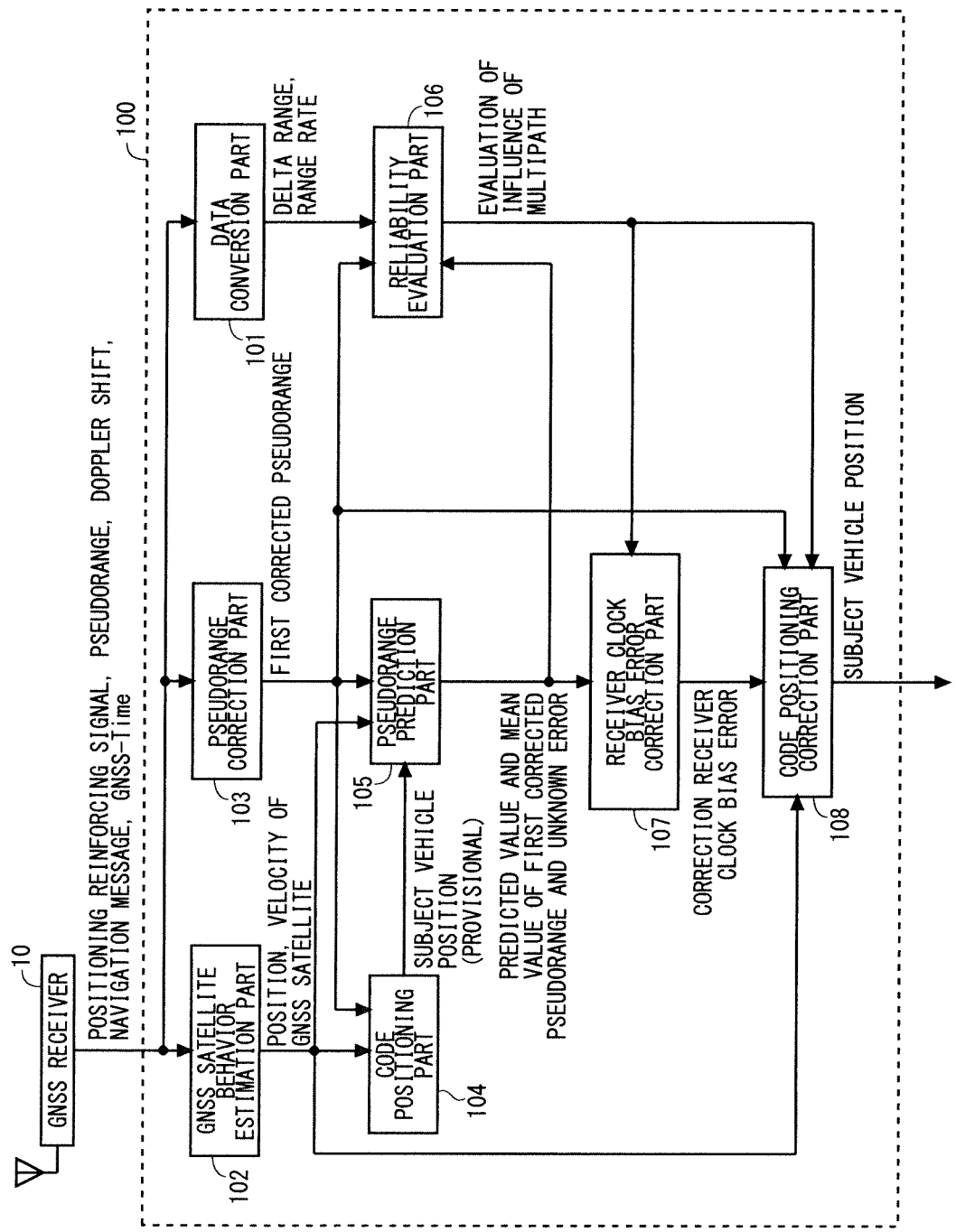
FIG. 2 is a block diagram illustrating a principal configuration of a locator device according to a first embodiment.

FIG. 2 is a block diagram illustrating a configuration of a principal part (part necessary for positioning its own position) of a locator device being a positioning device according to a first embodiment of the present invention. In this embodiment, the locator device is supposed to be mounted on a vehicle (mobile object). Further, a vehicle on which the locator device is mounted is referred to as a "subject vehicle." The locator device calculates its own position (position of an antenna of a GNSS receiver 10, to be strict), thereby specifying the position of the subject vehicle.

As in FIG. 2, the locator device includes a GNSS receiver 10 and a positioning part 100. The GNSS receiver 10 includes an antenna for receiving radio waves (including at least the L1 signal) radiated from a plurality of GNSS satellites (including at least the GPS satellite) that broadcast positioning signals, and radio waves radiated from a SBAS satellite (e.g., MTSAT) that broadcasts positioning reinforcing signals. The GNSS receiver 10 acquires Raw data (pseudorange, Doppler shift (change amount of carrier wave frequency), a navigation message, GNSS-Time, etc.) necessary for calculating the position of the subject vehicle from the positioning signals broadcast by each GNSS satellite, and outputs the Raw data and the positioning reinforcing signals (containing correction information of each of a satellite clock error, a satellite orbit error, ionospheric propagation delay, and tropospheric propagation delay) to the positioning part 100.

Note that, the GNSS receiver 10 may have a basic positioning function of calculating the position, the velocity, the azimuth, and the like of the subject vehicle from the Raw data. In this embodiment, positioning results of the GNSS receiver 10 are not used for high-precision positioning processing conducted by the positioning part 100. However, for example, such a configuration may be employed that the positioning part 100 alternatively outputs positioning results of the GNSS receiver 10 in a case where positioning processing of the positioning part 100 cannot be conducted.

The positioning part 100 includes a data conversion part 101, a GNSS satellite behavior estimation part 102, a pseudorange correction part 103, a code positioning part 104, a pseudorange prediction part 105, a reliability evaluation part 106, a receiver clock bias error correction part 107, and a code positioning correction part 108.

Based on the Raw data acquired from the GNSS receiver 10, concerning each of the GNSS satellites (receiving satellites) from which the GNSS receiver 10 receives radio waves, the data conversion part 101 calculates a time differential value of a pseudorange (delta range), and converts a Doppler frequency (Doppler shift amount) into a range rate of the same unit [m/s] as the delta range.

The GNSS satellite behavior estimation part 102 calculates the orbit (position and velocity) of the GNSS satellite in GNSS-Time using a navigation message and a positioning reinforcing signal of each GNSS satellite that are acquired from the GNSS receiver 10.

Based on the positioning reinforcing signal acquired from the GNSS receiver 10, the pseudorange correction part 103 corrects the pseudorange such that the satellite orbit error, the satellite clock error, the ionospheric propagation delay error, and the tropospheric propagation delay error contained in the pseudorange output from the GNSS receiver 10 are corrected. In the description below, the pseudorange corrected by the pseudorange correction part 103 is referred to as a "first corrected pseudorange."

The code positioning part 104 conducts code positioning using the orbit (position and velocity) of the GNSS satellite calculated by the GNSS satellite behavior estimation part 102 and the first corrected pseudorange calculated by the pseudorange correction part 103, and calculates the subject vehicle position (change amount thereof) and the receiver clock (bias error thereof). As in the later description, the subject vehicle position calculated by the code positioning part 104 is a provisional value used for correcting a receiver clock bias error, and is not the final positioning results of the positioning part 100. In this embodiment, calculation of the subject vehicle position and the subject vehicle velocity in code positioning is carried out using weighted least squares. However, for example, other calculation methods may be used, such as unweighted least squares and a Kalman filter.

The pseudorange prediction part 105 predicts a waveform of the first corrected pseudorange through polynomial approximation calculation. Further, the pseudorange prediction part 105 calculates a range (hereinafter referred to as a "two-point range") between the GNSS satellite and the subject vehicle that can be obtained from the position of the GNSS satellite and the subject vehicle position, and then calculates a difference between the two-point range and the first corrected pseudorange as an unknown error of the pseudorange. Further, a waveform of the unknown error is also predicted. Here, the above-mentioned "two-point range" is calculated from the position (coordinates) of the GNSS satellite and the subject vehicle position (coordinates), which is therefore different in definition from a "pseudorange" that is calculated from propagation time and propagation velocity of a positioning signal.

In this embodiment, prediction of the first corrected pseudorange and the unknown error in the pseudorange prediction part 105 is conducted through cubic polynomial approximation using five or more samples. However, a prediction method therefor is not limited thereto, and another approximation formula and estimation method may be used.

The reliability evaluation part 106 evaluates influence of multipath in a positioning signal received by the GNSS receiver 10 from each GNSS satellite. Specifically, the reliability evaluation part 106 calculates a difference between an observed value and a predicted value of the first corrected pseudorange (difference between the first corrected pseudorange calculated by the pseudorange correction part 103 and the first corrected pseudorange predicted by the pseudorange prediction part 105) and a difference between a delta range and a range rate calculated by the data conversion part 101, and determines that influence of multipath is large when any of the differences exceeds a predetermined threshold value. The details of this evaluation method are disclosed in, for example, Japanese Patent No. 4988028, WO 2014/002211 A1, etc. relating to patent applications of the inventor of the present invention.

The receiver clock bias error correction part 107 calculates a receiver clock bias error based on the unknown error of the pseudorange of each GNSS satellite predicted by the pseudorange prediction part 105. In the description below, the receiver clock bias error calculated by the receiver clock bias error correction part 107 is referred to as a "correction receiver clock bias error" so as to be distinguished from the error obtained by the code positioning of the code positioning part 104.

The code positioning correction part 108 conducts code positioning using the orbit of the GNSS satellite calculated by the GNSS satellite behavior estimation part 102, the first corrected pseudorange calculated by the pseudorange correction part 103, and the correction receiver clock bias error calculated by the receiver clock bias error correction part 107, and calculates the subject vehicle position and the receiver clock. That is, the code positioning correction part 108 calculates a "second corrected pseudorange" that is obtained by further correcting the first corrected pseudorange using the correction receiver clock bias error, and conducts code positioning using the second corrected pseudorange and the orbit of the GNSS satellite.

Figure 3:
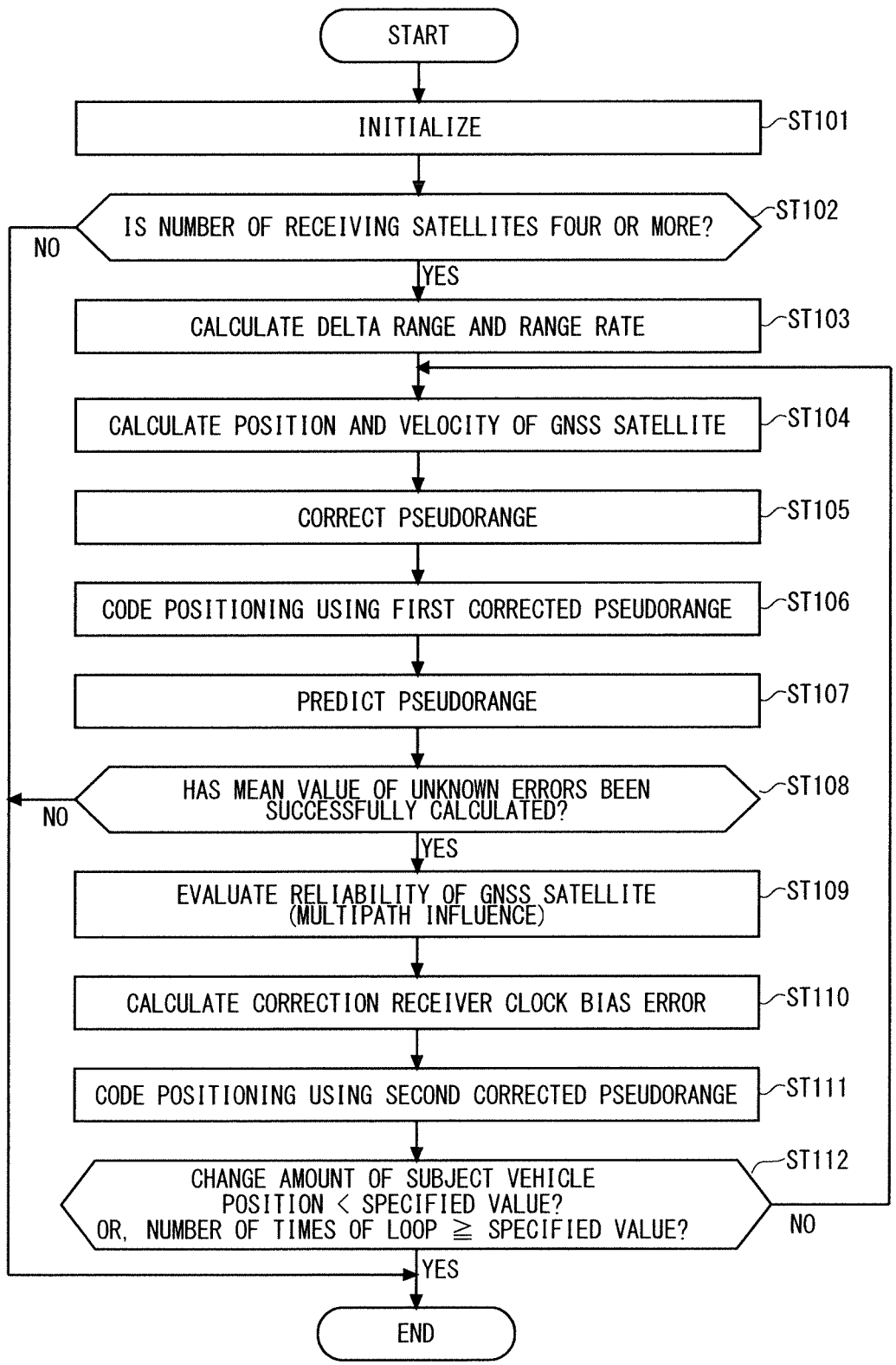
FIG. 3 is a flowchart illustrating positioning processing in the locator device according to the first embodiment.

Next, description is given of positioning processing conducted by the locator device according to the first embodiment. FIG. 3 is a flowchart illustrating the positioning processing. The positioning processing is executed by the positioning part 100 with a predetermined cycle.

When the positioning processing is started, the positioning part 100 initializes positioning processing (Step ST101), and confirms whether the number of GNSS satellites from which the GNSS receiver 10 receives radio waves (number of receiving satellites) is four or more (Step ST102). When the number of the receiving satellites is less than four (NO in Step ST102), the current positioning processing is ended as it is.

When the number of the receiving satellites is four or more (YES in Step ST102), the data conversion part 101 calculates a delta range being a time change amount of the pseudorange concerning each GNSS satellite (receiving satellite), based on Expression (1) below. Further, the data conversion part 101 converts a Doppler frequency of a carrier wave from each GNSS satellite into a range rate, based on Expression (2) below (Step ST103).

[Expression 1]

$$\Delta \rho_{cr\_i}(t_j) = \{\rho_{cr\_i}(t_j) - \rho_{cr\_i}(t_{j-1})\}/\Delta t \quad (1)$$

where $\rho_{c\tau\_i}(t_j)$: delta range [m/s]
$\rho_{c\tau\_i}(t_j)$: pseudorange output from GNSS satellite [i] in current positioning processing [m]
$\rho_{c\tau\_i}(t_{j-1})$: pseudorange output from GNSS satellite [i] in previous positioning processing [m]
$\Delta t$: cycle of positioning processing [s]

[Expression 2]

$$\Delta\rho_{c\tau\_i}(t_j) = f_{dop\_i}(t) \cdot C/f_{L1} \quad (2)$$

where
$\Delta\rho_{c\tau\_i}(t_j)$: calculated range rate [m/s]
$f_{dop\_i}(t_j)$: Doppler frequency of GNSS satellite [i] [Hz]
$f_{L1}$: carrier wave frequency of satellite radio wave [Hz]
C: speed of light [m/s]

After that, the positioning part 100 calculates the subject vehicle position based on Raw data. The calculation of the subject vehicle position is conducted by convergence calculation of loop processing of Steps ST104 to ST112 described below. Accordingly, Steps ST104 to ST112 are executed for a plurality of times in a single-time positioning processing.

In Step ST104, the GNSS satellite behavior estimation part 102 calculates the position and the velocity of each GNSS satellite in GNSS-Time using the satellite orbit error of a navigation message and a positioning reinforcing signal of each GNSS satellite.

In Step ST105, the pseudorange correction part 103 corrects the pseudorange output by the GNSS receiver 10 based on the satellite clock error, the ionospheric propagation delay error, and the tropospheric propagation delay error that can be obtained from the positioning reinforcing signal, using Expression (3) below. With this, the first corrected pseudorange is obtained.

[Expression 3]

$$\rho_{c\tau\_i}(t_j) = \rho_{c\tau\_i}(t_j) + dT_{sat\_i} - dT_{rcv\text{-}bias} - d_{iono} - d_{trop} - d_{pnoise} \quad (3)$$

where
$\Delta\rho_{c\tau\_i}(t_j)$: pseudorange of GNSS satellite [i] in which satellite clock error, ionospheric delay error, and tropospheric delay error are corrected (first corrected pseudorange) [m]
$dT_{sat\_i}$: satellite clock error of GNSS satellite [i] [m]
$dT_{rcv\text{-}bias}$: bias error of GNSS receiver clock [m]
$d_{iono}$: ionospheric radio wave propagation delay error [m]
$d_{trop}$: tropospheric radio wave propagation delay error [m]
$d_{pnoise}$: observational error such as multipath [m]

In Step ST106, the code positioning part 104 conducts code positioning using the first corrected pseudorange. Specifically, using Expression (4) below, the code positioning part 104 calculates the subject vehicle position (change amount thereof) and the receiver clock (bias error thereof) based on the position and the velocity of the GNSS satellite calculated by the GNSS satellite behavior estimation part 102 and the pseudorange (first corrected pseudorange) corrected by the pseudorange correction part 103. In this embodiment, standard deviation of errors of the pseudorange is 1.

[Expression 4]

$$dPo = (A^T W A)^{-1}(A^T W) \times \begin{vmatrix} \rho'_{c\tau\_1} - R_1 \\ \rho'_{c\tau\_2} - R_2 \\ \vdots \\ \rho'_{c\tau\_3} - R_n \end{vmatrix} \quad (4)$$

$$P_0 = P_0 + dP_0$$

$$R_i = \sqrt{(x_{s\_i} - x_0)^2 + (y_{s\_i} - y_0)^2 + (z_{s\_i} - z_0)^2}$$

$$W = \begin{vmatrix} 1/(\sigma_{\rho\_1})^2 & 0 & 0 & 0 \\ 0 & 1/(\sigma_{\rho\_2})^2 & 0 & 0 \\ \vdots & \vdots & \vdots & \vdots \\ 0 & 0 & 0 & 1/(\sigma_{\rho\_n})^2 \end{vmatrix}$$

$$A = \begin{vmatrix} LOS_{x\_1} & LOS_{y\_1} & LOS_{z\_1} & 1 \\ LOS_{x\_2} & LOS_{y\_2} & LOS_{z\_2} & 1 \\ \vdots & \vdots & \vdots & \vdots \\ LOS_{x\_n} & LOS_{y\_n} & LOS_{z\_n} & 1 \end{vmatrix}$$

$$LOS_{x\_i} = (x_0 - x_{s\_i})/\|P_{s\_i} - P_0\|$$
$$LOS_{y\_i} = (y_0 - y_{s\_i})/\|P_{s\_i} - P_0\|$$
$$LOS_{z\_i} = (z_0 - z_{s\_i})/\|P_{s\_i} - P_0\|$$
$$\|P_{s\_i} - P_0\| = \sqrt{(x_{s\_i} - x_0)^2 + (y_{s\_i} - y_0)^2 + (z_{s\_i} - z_0)^2}$$

where
$P_{s\_i}$: position of GNSS satellite [i] ($x_{s\_i}$, $y_{s\_i}$, $z_{s\_i}$) [m]
$P_0$: subject vehicle position ($x_0$, $y_0$, $z_0$) [m]
$dP_0$: change amount of subject vehicle position ($d_{x0}$, $dy_{y0}$, $d_{z0}$, $T_{rcv\text{-}drift}$) [m]
A: navigation matrix
W: weighted matrix
n: number of receiving satellites
$\sigma_{\sigma\_i}$: standard deviation of error of pseudorange of GNSS satellite [i] [m]
$\|P_{s\_i} - P_0\|$: distance between position of GNSS satellite [i] and subject vehicle position [m]
$LOS_i$: line of sight vector (line of sight vector) when viewing GNSS satellite [i] from subject vehicle ($LOS_{x\_i}$, $LOS_{x\_i}$, $LOS_{x\_i}$)

In Step ST107, the pseudorange prediction part 105 predicts a waveform of the pseudorange through cubic polynomial approximation based on the first corrected pseudorange. Further, the pseudorange prediction part 105 calculates a difference between the two-point range between the GNSS satellite and the subject vehicle and the first corrected pseudorange as an unknown error of the pseudorange, and also predicts a waveform of the obtained unknown error through cubic polynomial approximation. Further, the pseudorange prediction part 105 determines a mean value and a standard deviation of unknown errors from a predicted value of unknown errors of each GNSS satellite. At this time, if there is a GNSS satellite having a large deviation relative to the mean value, a mean value and a standard deviation of the unknown errors are determined again excluding such a GNSS satellite.

In Step ST108, whether the pseudorange prediction part 105 has successfully calculated a mean value of unknown errors is confirmed. For example, a mean value of unknown errors cannot be calculated in a case where there is a significant dispersion in unknown errors of the GNSS satellites and therefore GNSS satellites having a large deviation are excluded, resulting in lack of the number (four) of the remaining GNSS satellites necessary for conducting positioning. In a case where a mean value of unknown errors cannot be calculated (NO in Step ST108), the current positioning processing is ended as it is.

On the other hand, when a mean value of unknown errors is calculated (YES in Step ST108), the processing proceeds to Step ST109. In Step ST109, the reliability evaluation part 106 confirms whether or not a difference between an observed value and a predicted value of the first corrected pseudorange (a difference between the first corrected pseudorange calculated by the pseudorange correction part 103 and the first corrected pseudorange predicted by the pseudorange prediction part 105) and a difference between a delta range and a range rate calculated by the data conversion part 101 exceed respective threshold values, thereby evaluating influence of multipath of each GNSS satellite.

In Step ST110, the receiver clock bias error correction part 107 calculates a correction receiver clock bias error based on the mean value of the unknown errors of the pseudorange calculated by the pseudorange prediction part 105. In the case of the most satisfactory condition (where there are only GNSS satellites under open sky with no multipath), the mean value of unknown errors is adopted as the receiver clock bias error.

Figure 4:
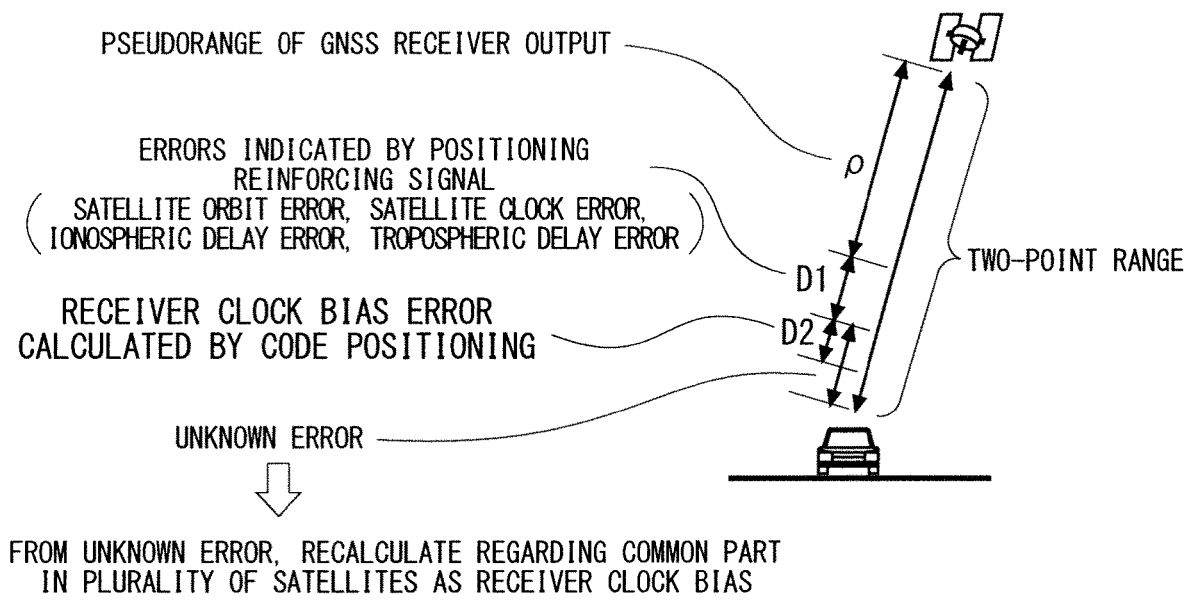
FIG. 4 is a diagram illustrating a relationship between an unknown error of a pseudorange and a receiver clock bias error.
Figure 5:
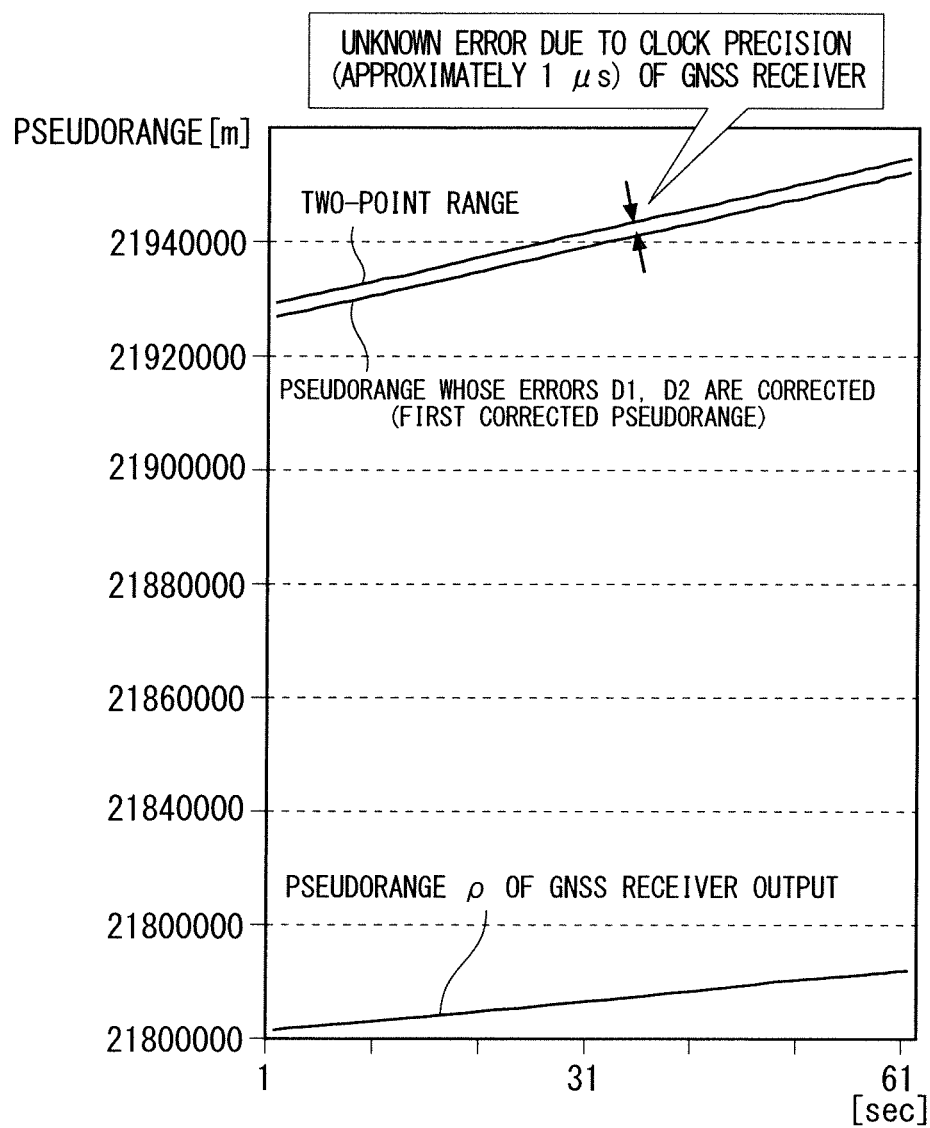
FIG. 5 is a graph illustrating a relationship between an unknown error of a pseudorange and a receiver clock bias error.
Figure 6:
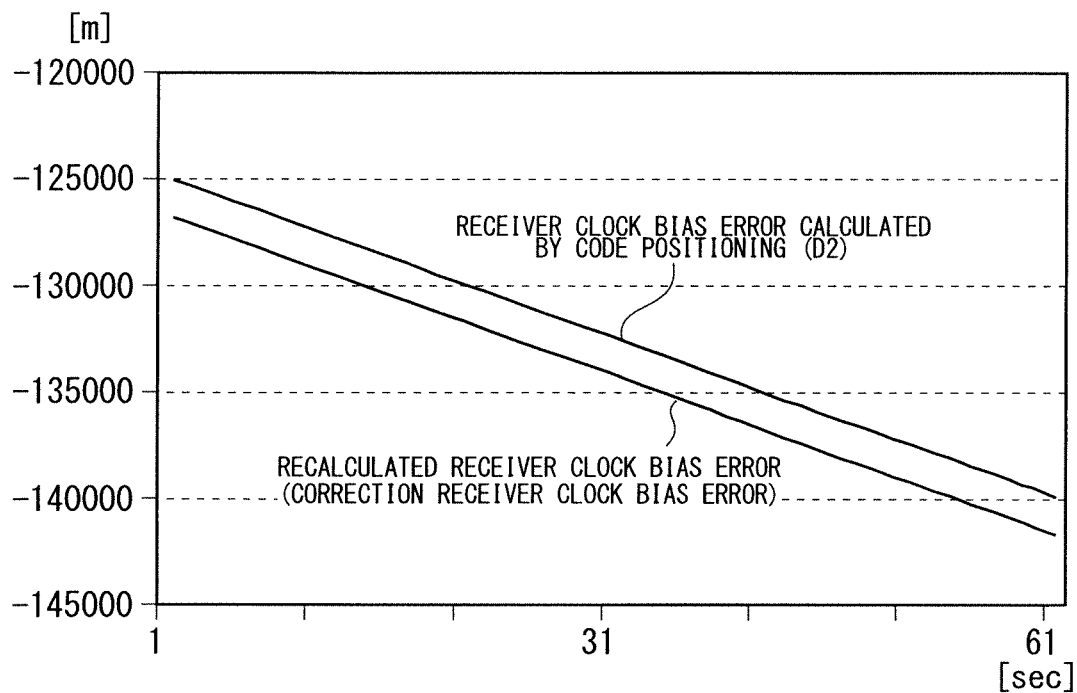
FIG. 6 is a graph illustrating a relationship between an unknown error of a pseudorange and a receiver clock bias error.
Figure 7:
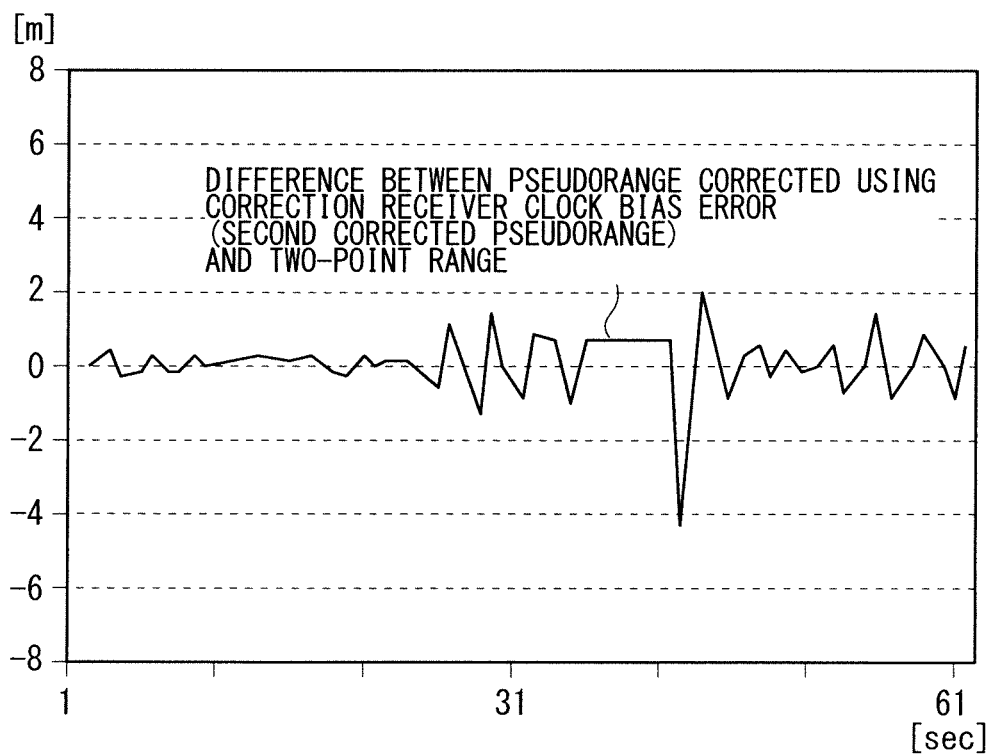
FIG. 7 is a graph illustrating a relationship between an unknown error of a pseudorange and a receiver clock bias error.

Here, description is given of a relationship between an unknown error of a pseudorange and a receiver clock bias error. The two-point range between a subject vehicle position obtained by code positioning and a position of a GNSS satellite, a pseudorange output by a GNSS receiver, errors indicated by a positioning reinforcing signal, and a receiver clock bias error calculated by code positioning have a relationship shown in FIG. 4 and FIG. 5. Even in the condition of open sky, an unknown error generated due to clock precision of the GNSS receiver (approximately 1 μsec in a case of a GNSS receiver for a vehicle) remains in a pseudorange of each GNSS satellite. Therefore, a common component in unknown errors in the pseudorange of a plurality of GNSS satellites is assumed to be a receiver clock bias error. Therefore, the receiver clock bias error correction part 107 recalculates a mean value of unknown errors of the pseudorange of a plurality of GNSS satellites as a new receiver clock bias error. With this, a correction receiver clock bias error as shown in FIG. 6 is obtained. As shown in FIG. 7, a difference between the pseudorange corrected using the correction receiver clock bias error (second corrected pseudorange used in code positioning of the code positioning correction part 108) and the two-point range is reduced.

Note that, a receiver clock bias error cannot be correctly detected from an unknown error of a pseudorange of a GNSS satellite that is largely affected by multipath. Therefore, based on the evaluation of the reliability evaluation part 106, the receiver clock bias error correction part 107 selects GNSS satellites excluding GNSS satellites that are largely affected by multipath to determine a mean value of unknown errors thereof, and adopts the value as the receiver clock bias error.

In Step ST111, the code positioning correction part 108 calculates the second corrected pseudorange that is obtained by further correcting the first corrected pseudorange using the correction receiver clock bias error, and conducts code positioning using the second corrected pseudorange and the orbit (position and velocity) of the GNSS satellite, thereby calculating the subject vehicle position and the receiver clock. Note that, in a case where a difference between the first corrected pseudorange and a predicted value thereof is larger than a predetermined value, the code positioning correction part 108 calculates the second corrected pseudorange by correcting the predicted value instead of the first corrected pseudorange.

In Step ST112, whether or not subject vehicle position calculation in the current positioning processing has converged is determined. Specifically, when a change amount of the subject vehicle position ($dP_O$ in Expression (4)) is smaller than a specified value, determination is made that the calculation has converged. In a case where determination is made that the calculation has converged (YES in Step ST112), the processing exits from the loop processing, ending the current positioning processing normally. In a case where determination is made that the calculation has not yet converged (NO in Step ST112), the processing returns to Step ST104, continuing the loop processing.

Note that, also in a case where the number of times of loop processing (number of times of loop) in the current positioning processing reaches a specified value or more without convergence of the subject vehicle position calculation, determination is made to be YES in Step ST112, exiting from the loop processing. In this case, however, the subject vehicle position calculation is determined to be unable to converge, thus ending the processing abnormally.

According to this embodiment, the subject vehicle position (change amount thereof) and the receiver clock (bias error thereof) are calculated using the first corrected pseudorange in which errors (satellite clock error, satellite orbit error, ionospheric propagation delay, and tropospheric propagation delay) indicated by a positioning reinforcing signal are corrected and the orbit (position and velocity) of the GNSS satellite. Hence, as compared to the case where the positioning reinforcing signal is not used, precision of the calculated subject vehicle position and receiver clock is enhanced. Further, GNSS satellites less affected by multipath are selected in advance, and then an unknown error being a difference between the two-point range between each GNSS satellite and a subject vehicle and the first corrected pseudorange is determined, and a correction receiver clock bias error is calculated from the unknown error of a plurality of GNSS satellites. Hence, precision thereof is also enhanced. Then, the final subject vehicle position is calculated based on the second corrected pseudorange obtained by further correcting the first corrected pseudorange using the correction receiver clock bias error. Thus, the subject vehicle position can be calculated with high precision.

Further, the correction receiver clock bias error is calculated from unknown errors of a plurality of GNSS satellites, and hence clock precision of the GNSS receiver 10 need not be very high. Further, the GNSS receiver 10 does not conduct special processing, and hence a calculation processing load on a CPU of the GNSS receiver 10 is light. Therefore, implementation is possible using a low-cost GNSS receiver 10, which can contribute to cost reduction of a locator device.

Further, in this embodiment, the correction receiver clock bias error is calculated from the mean of unknown errors of a plurality of GNSS satellites. However, the correction receiver clock bias error may be calculated from the median of unknown errors of a plurality of GNSS satellites, not from the mean value of unknown errors of a plurality of GNSS satellites. Also in a case where the correction receiver clock bias error is calculated from the median of unknown errors of a plurality of GNSS satellites, GNSS satellites less affected by multipath are selected in advance, and then unknown errors are determined. If there is a GNSS satellite having a large deviation relative to the median, the median of the unknown errors may be determined again excluding such a GNSS satellite.

Note that, in the calculation processing of the subject vehicle position and the receiver clock of the code positioning correction part 108, such a configuration may be employed that either of an observed value of the first corrected pseudorange (first corrected pseudorange calculated by the pseudorange correction part 103) or a predicted value (first corrected pseudorange predicted by the pseudorange prediction part 105) is selected based on reliability (influence of multipath) of the first corrected pseudorange. For example, determination may be made that momentary interruption of radio waves or multipath has occurred concerning a GNSS satellite having a difference between an observed value and a predicted value of the first corrected pseudorange larger than a predetermined threshold value, and the second corrected pseudorange may be calculated using the predicted value instead of the observed value of the first corrected pseudorange, to thereby conduct code positioning. In this manner, the subject vehicle position and the receiver clock bias error can be calculated continuously and stably.

Figure 8:
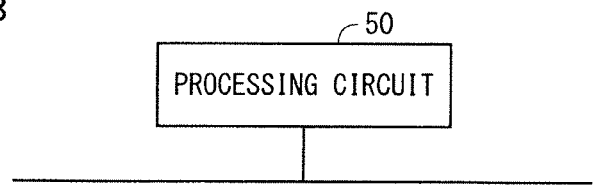
FIG. 8 is a diagram illustrating an example of a hardware configuration of a positioning part.
Figure 9:
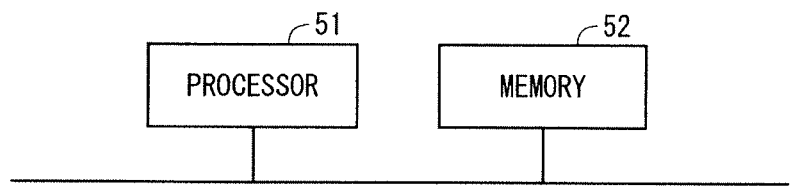
FIG. 9 is a diagram illustrating an example of a hardware configuration of a positioning part.

FIG. 8 and FIG. 9 are each a diagram illustrating an example of a hardware configuration of the positioning part 100 of the locator device. Each component of the positioning part 100 illustrated in FIG. 2 (data conversion part 101, GNSS satellite behavior estimation part 102, pseudorange correction part 103, code positioning part 104, pseudorange prediction part 105, reliability evaluation part 106, receiver clock bias error correction part 107, and code positioning correction part 108) is implemented by, for example, a processing circuit 50 illustrated in FIG. 8. That is, the processing circuit 50 includes the code positioning part 104 for calculating the position of the subject vehicle and the receiver clock based on the first corrected pseudorange, the receiver clock bias error correction part 107 for determining, concerning a plurality of GNSS satellites that are affected by multipath to a smaller extent than a predetermined value, a receiver clock bias error of a pseudorange based on an unknown error being the two-point range between the position of each GNSS satellite and the position of the subject vehicle and the first corrected pseudorange, and the code positioning correction part 108 for recalculating the position of the subject vehicle using the second corrected pseudorange that is obtained by correcting the first corrected pseudorange using the receiver clock bias error calculated by the receiver clock bias error correction part 107. As the processing circuit 50, dedicated hardware may be applied, or a processor (a central processing unit, a central processor, a processing unit, an arithmetic unit, a microprocessor, a microcomputer, or a digital signal processor) for executing a program stored in memory may be applied.

In a case where the processing circuit 50 is dedicated hardware, for example, a single circuit, a composite circuit, a programmed processor, a processor for a parallel program, an ASIC, an FPGA, a combination thereof, or the like is applicable as the processing circuit 50. The function of each component of the positioning part 100 may be implemented by a plurality of processing circuits 50, or the functions thereof may be implemented collectively by one processing circuit 50.

FIG. 9 is an illustration of a hardware configuration of the positioning part 100 in a case where the processing circuit 50 is configured using a processor. In this case, the function of each component of the positioning part 100 is implemented by a combination with software or the like (software, firmware, or software and firmware). Software or the like is described as a program, and is stored in memory 52. A processor 51 as the processing circuit 50 reads out and executes a program stored in the memory 52, thereby implementing the function of each part. That is, at the time of being executed by the processing circuit 50, the positioning part 100 includes the memory 52 for storing a program to eventually execute a step of calculating the position of the subject vehicle and the receiver clock based on the first corrected pseudorange, a step of determining, concerning a plurality of GNSS satellites that are affected by multipath to a smaller extent than a predetermined value, a difference between the two-point range between the position of each GNSS satellite and the position of the subject vehicle and the first corrected pseudorange as an unknown error and then calculating a receiver clock bias error of a pseudorange based on the unknown error, and a step of recalculating the position of the subject vehicle using the second corrected pseudorange that is obtained by correcting the first corrected pseudorange using the calculated receiver clock bias error. In other words, it can be said that this program makes a computer execute operations, procedures, and methods of each component of the positioning part 100.

Here, as the memory 52, for example, non-volatile or volatile semiconductor memory such as random access memory (RAM), read only memory (ROM), flash memory, erasable programmable read only memory (EPROM), and electrically erasable programmable read only memory (EEPROM), a hard disk drive (HDD), a magnetic disk, a flexible disk, an optical disc, a compact disc, a MiniDisc, a digital versatile disc (DVD), a drive device thereof, or the like is applicable.

In the above, description is given of a configuration in which the function of each component of the positioning part 100 is implemented by any one of hardware, software, and the like. However, the configuration is not limited thereto, and such a configuration may be employed that a part of the components of the positioning part 100 are implemented by dedicated hardware, and another part of the components are implemented by software or the like. For example, the functions of a part of components may be implemented by the processing circuit 50 as dedicated hardware, and the functions of another part of components may be implemented by the processing circuit 50 as the processor 51 reading out and executing a program stored in the memory 52.

As described above, the positioning part 100 can implement each function described above with hardware, software, and the like, or a combination thereof.

Second Embodiment

Figure 10A:
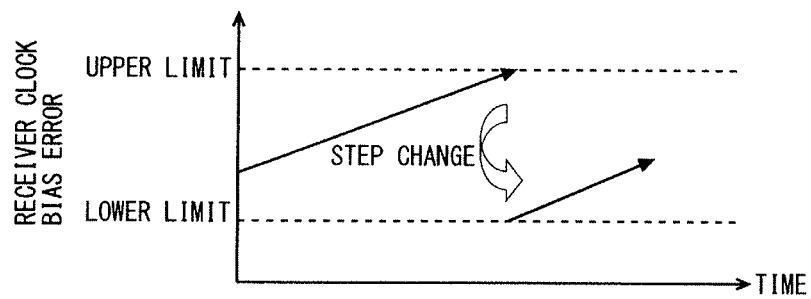
FIGS. 10A and 10B are each a diagram illustrating a step change of the receiver clock bias error generated in a GNSS receiver.
Figure 10B:
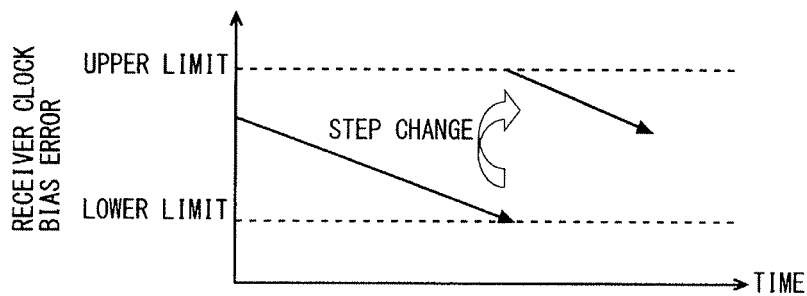

Some GNSS receivers have a function of forcibly (automatically) correcting a receiver clock bias error when the receiver clock bias error falls out of a predetermined range. In such GNSS receivers, as in FIGS. 10A and 10B, for example, operations of correcting an upper limit into a lower limit value when a receiver clock bias error reaches the upper limit (FIG. 10A), and correcting a lower limit into an upper limit value when a receiver clock bias error reaches the lower limit (FIG. 10B) are conducted. With this, a significant change (step change) occurs in the receiver clock bias error.

Figure 11:
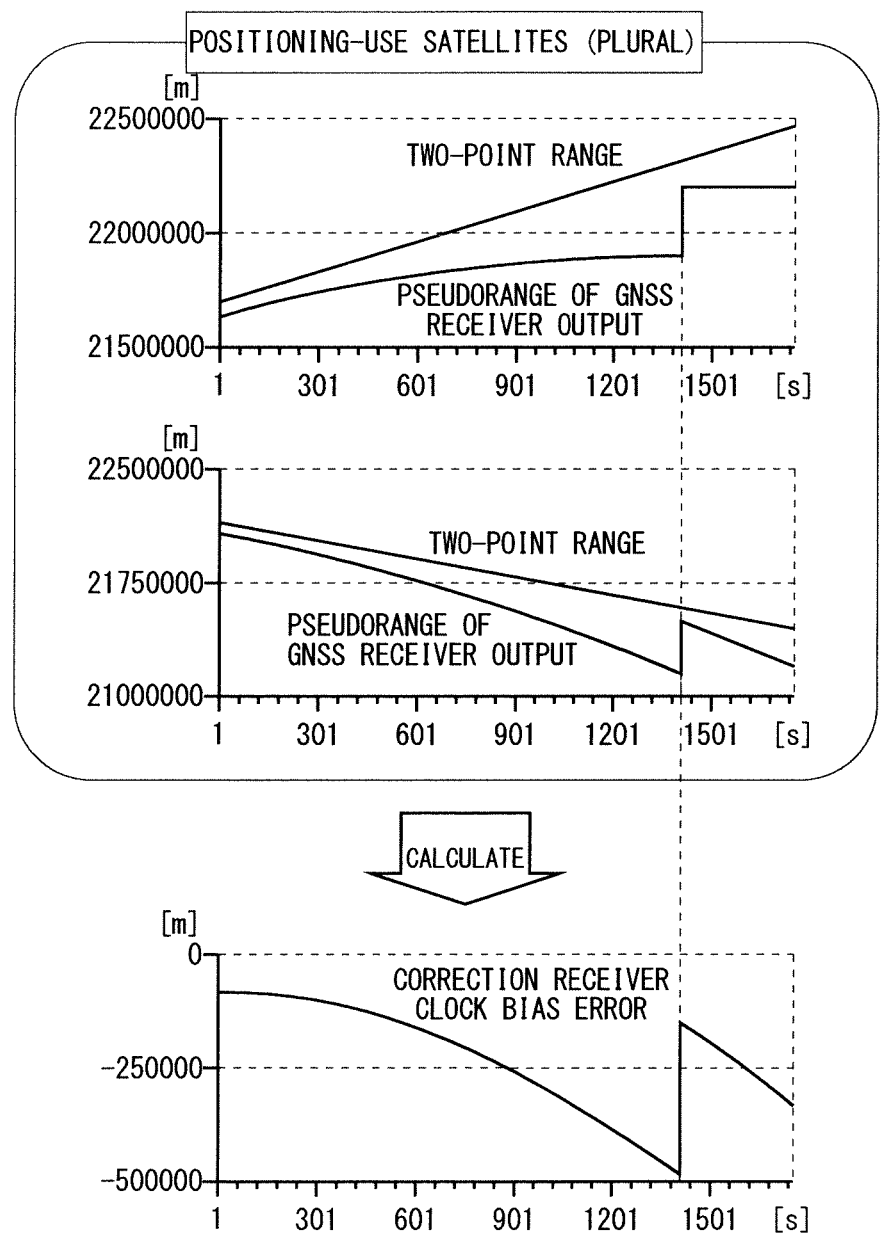
FIG. 11 is a diagram illustrating a step change of the receiver clock bias error generated in the GNSS receiver.

In triangulation, four unknowns of three-dimensional coordinates of the subject vehicle position and a receiver clock are solved. Therefore, in principle, a step change occurs in the pseudorange of all of the GNSS satellites output by the GNSS receiver 10 at the same timing as a step change of a receiver clock bias error. In the first embodiment, a simultaneous step change in the pseudorange of all of the GNSS satellites enables the receiver clock bias error correction part 107 to normally calculate a correction receiver clock bias error as shown in FIG. 11. However, in rare cases, the timing of a step change of the pseudorange does not match between a plurality of receiving channels. In such cases, a step change of the pseudorange of a part of the GNSS satellites occurs at a different timing in appearance, and thus the subject vehicle position and the receiver clock cannot be calculated correctly. Therefore, a correction receiver clock bias error cannot be calculated correctly.

Further, in the first embodiment, at the time of calculation of a predicted value of the first corrected pseudorange with the reliability evaluation part 106, when a history (waveform of the first corrected pseudorange) used for the calculation becomes discontinuous due to the step change, such needs to be corrected in order to obtain a precise predicted value. In this embodiment, a locator device capable of solving the problems as above is proposed.

Figure 12:
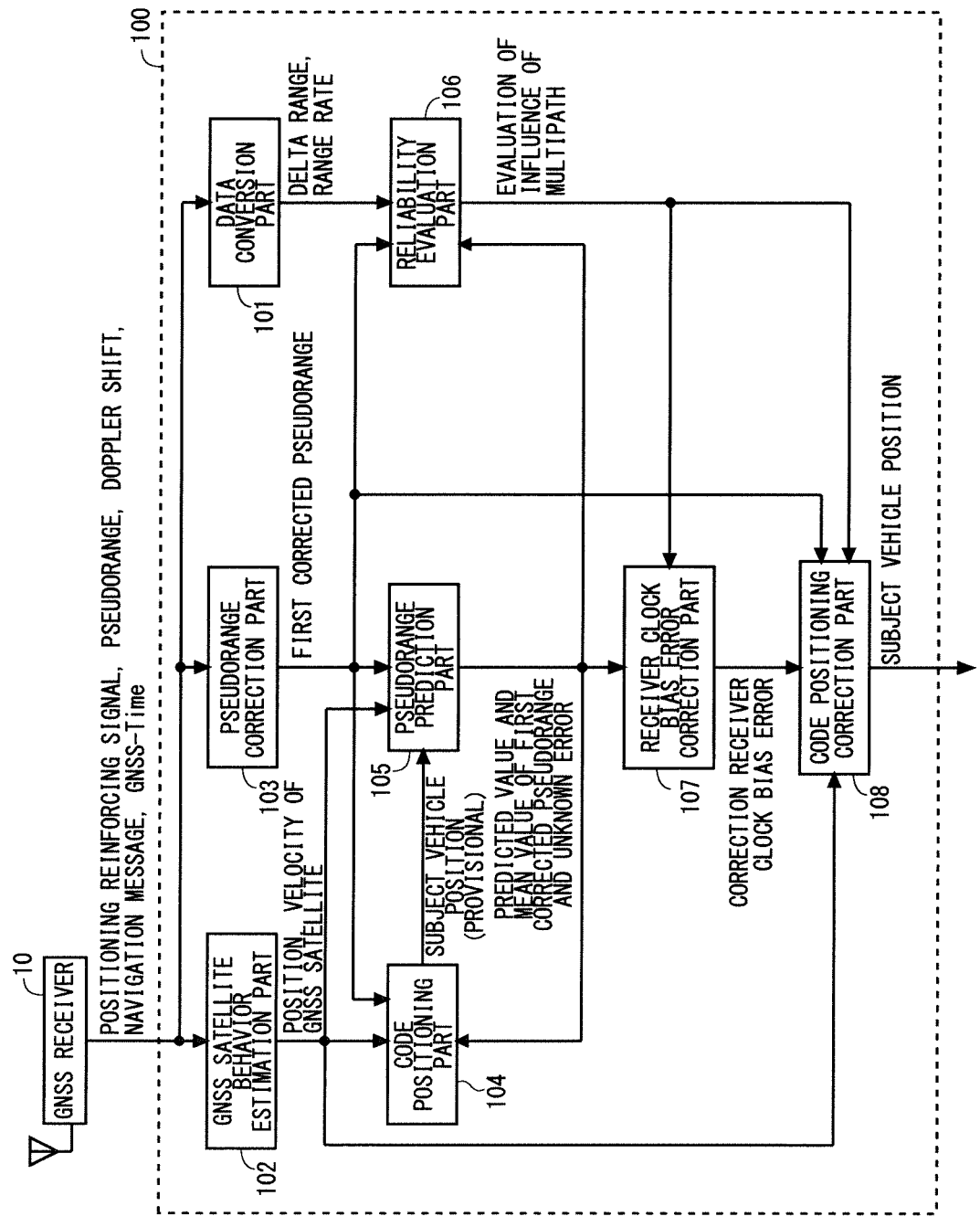
FIG. 12 is a block diagram illustrating a principal configuration of a locator device according to a second embodiment.

FIG. 12 is a block diagram illustrating a principal configuration of a locator device (positioning device) according to a second embodiment. In the second embodiment, the GNSS receiver 10 is supposed to have a function of forcibly correcting a receiver clock bias error. Further, the configuration of the positioning part 100 of FIG. 12 is different from that of FIG. 2 in that an output of the pseudorange prediction part 105 is input to the code positioning part 104. Other configuration is the same as that of FIG. 2, and therefore description thereof is herein omitted.

The pseudorange prediction part 105 predicts a first corrected pseudorange and a waveform of an unknown error as in the first embodiment. In the second embodiment, however, the pseudorange prediction part 105 further has a function of monitoring a step change of a receiver clock bias error occurring in the GNSS receiver 10, and when a step change occurs, correcting (restoring) a waveform of the first corrected pseudorange in which a step change has occurred due to such a step change and a continuous waveform.

Figure 13:
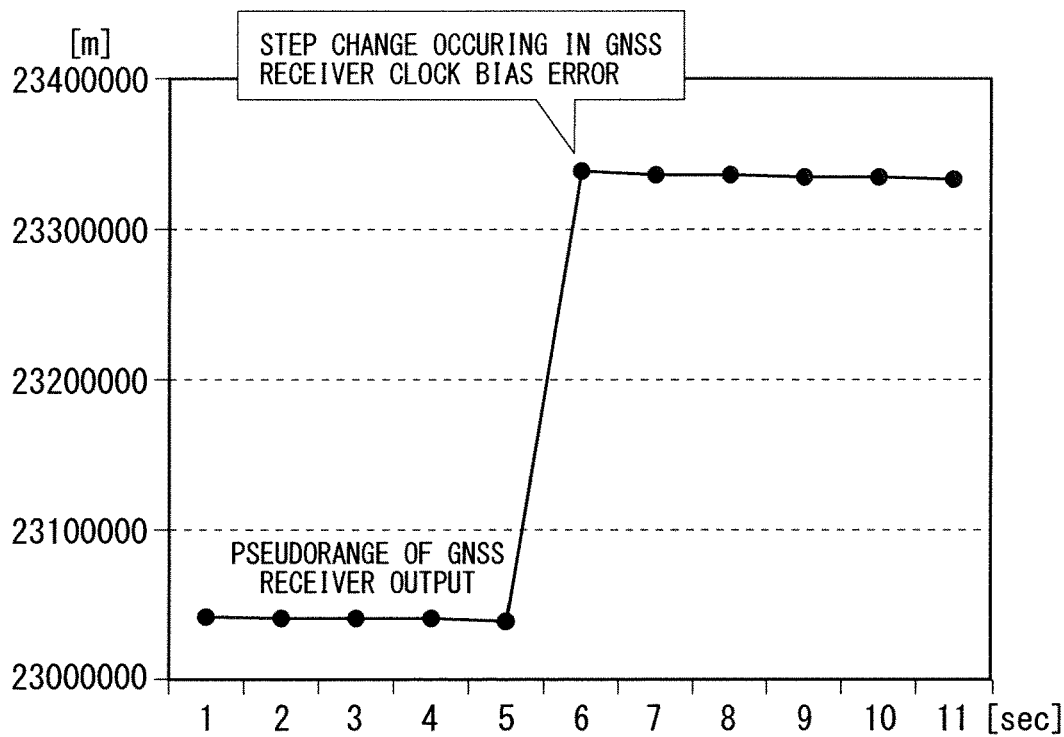
FIG. 13 is a graph illustrating operation of the locator device according to the second embodiment.
Figure 14:
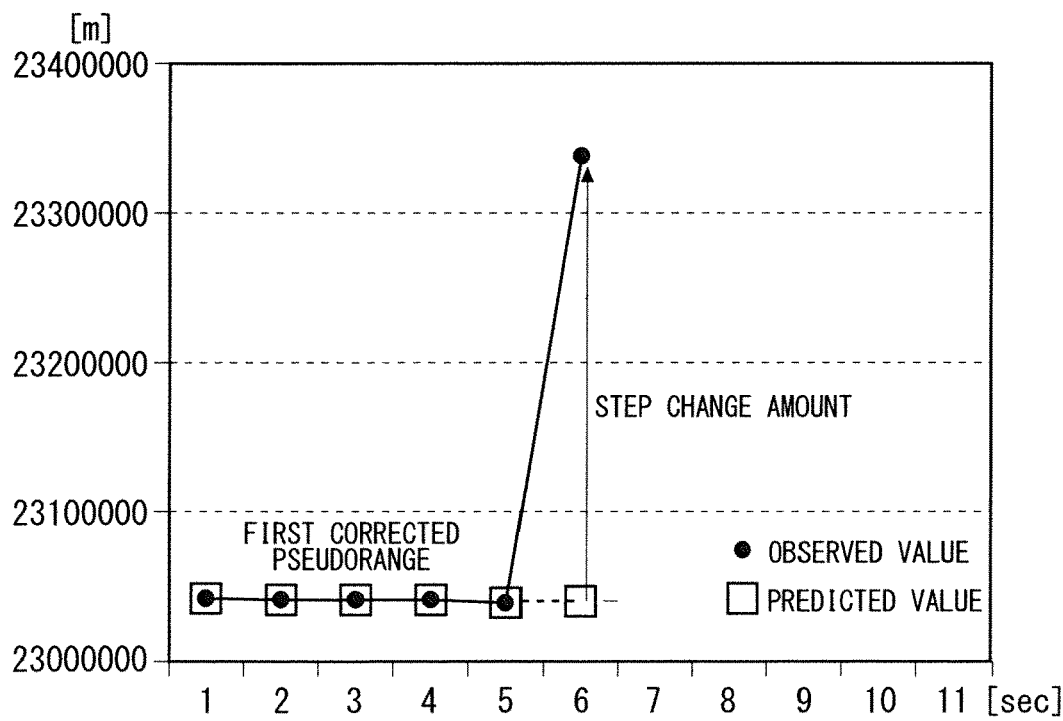
FIG. 14 is a graph illustrating operation of the locator device according to the second embodiment.

For example, as in FIG. 13, a step change is assumed to occur in a pseudorange output by the GNSS receiver 10 due to a step change of a receiver clock bias error in the GNSS receiver 10. At this time, as in FIG. 14, a large difference is generated between a calculated value (observed value) of the first corrected pseudorange obtained by the pseudorange correction part 103 and a predicted value predicted by the pseudorange prediction part 105. The pseudorange prediction part 105 calculates the magnitude of the difference, and determines that a step change has occurred in the first corrected pseudorange due to a step change of a receiver clock bias error when the magnitude of the difference is such magnitude as to be hardly considered to be attributed to the influence of multipath.

In such a case, the pseudorange prediction part 105 notifies the code positioning part 104 of occurrence of a step change. Upon receiving a notice of a step change, at the time of the processing of Step ST106 of FIG. 3, the code positioning part 104 eliminates a GNSS satellite with a delayed step change from satellites used for positioning (positioning-use satellites) so as to have a uniform step change amount in all of the GNSS satellites used for positioning.

Figure 15:
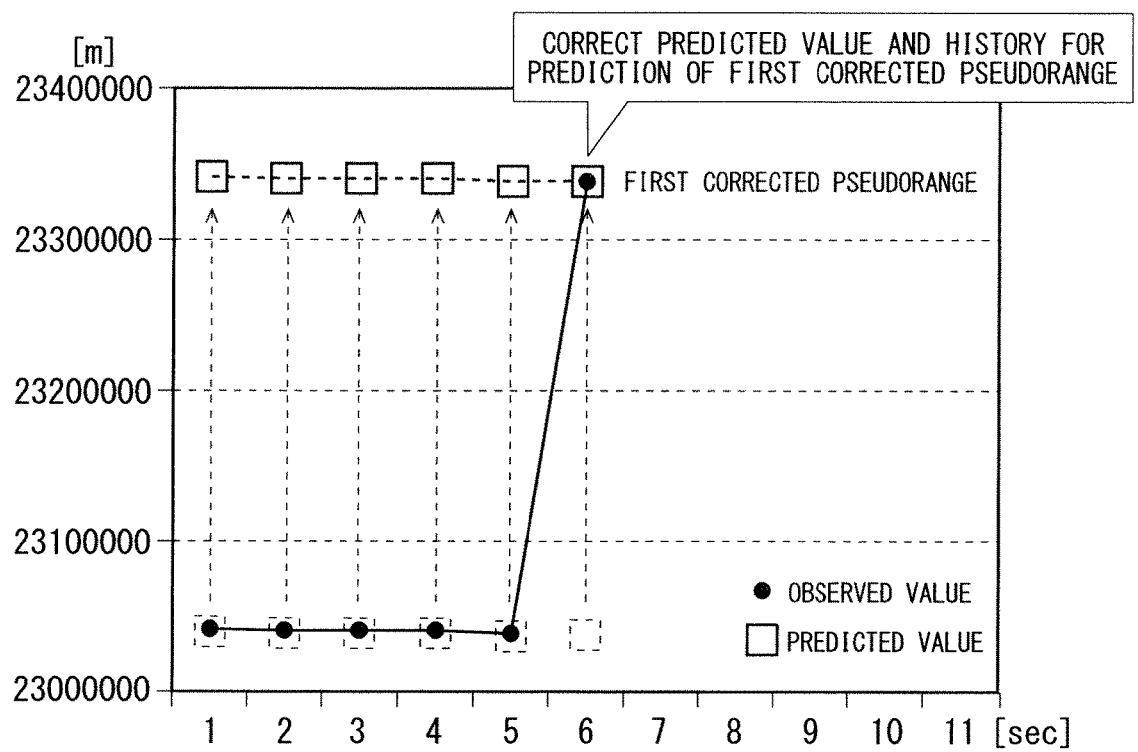
FIG. 15 is a graph illustrating operation of the locator device according to the second embodiment.
Figure 16:
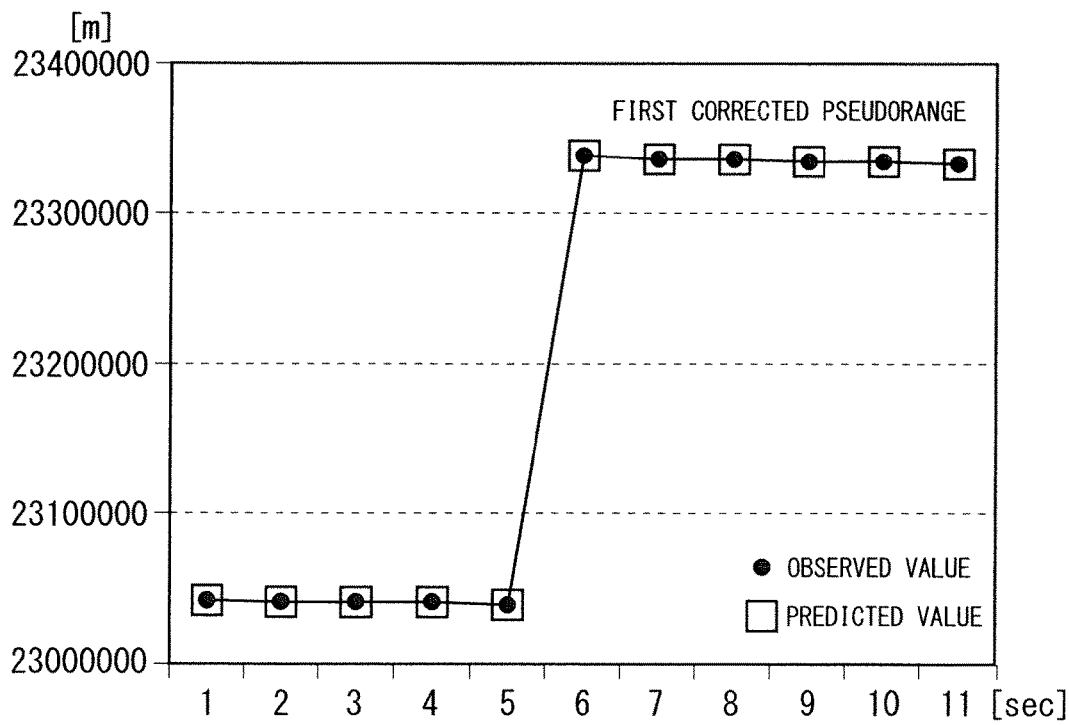
FIG. 16 is a graph illustrating operation of the locator device according to the second embodiment.

Further, as in FIG. 15, the pseudorange prediction part 105 corrects a predicted value of the first corrected pseudorange and a history of polynomial approximation for calculating the predicted value based on the magnitude (step change amount) of a step change. With this, as in FIG. 16, continuity of a history (continuity of a waveform of the first corrected pseudorange) to be used for calculating predicted values in subsequent time can be secured, and therefore calculation of predicted values can be continued even thereafter.

As described above, according to the locator device of the second embodiment, even when a step change occurs in a receiver clock bias error, all of the receiving channels used for positioning can have the same condition of a step change. Hence, the subject vehicle position and the receiver clock can be calculated with high precision.

Further, in this embodiment, a GNSS satellite with a delayed step change is eliminated from positioning-use satellites when a step change occurs. However, for example, a waveform obtained by restoring a first corrected pseudorange into a continuous waveform in consideration of a step change may be used in code positioning for each GNSS satellite. In this manner, the number of positioning-use satellites can be maintained, and therefore deviation of a calculated value of the subject vehicle position and reduction of a positioning rate due to reduction of the number of positioning-use satellites can be prevented.

Third Embodiment

Figure 17:
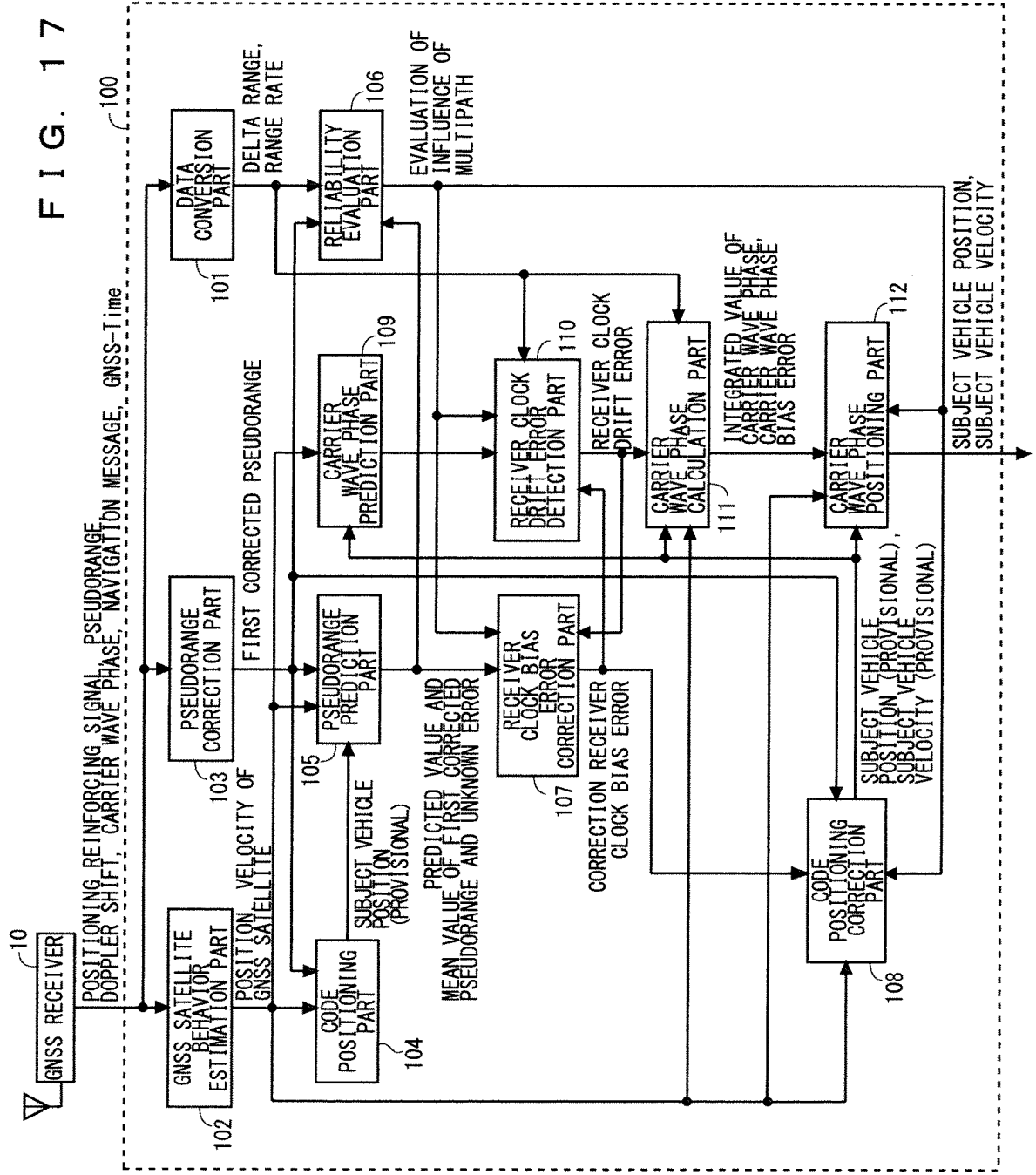
FIG. 17 is a block diagram illustrating a principal configuration of a locator device according to a third embodiment.

FIG. 17 is a block diagram illustrating a principal configuration of a locator device (positioning device) according to a third embodiment. As compared to the configuration of the first embodiment (FIG. 2), a locator device of FIG. 17 has a configuration in which a carrier wave phase prediction part 109, a receiver clock drift error detection part 110, a carrier wave phase calculation part 111, and a carrier wave phase positioning part 112 are added, thereby being capable of conducting positioning using a carrier wave phase. Further, in the third embodiment, the GNSS receiver 10 further outputs a carrier wave phase obtained by integrating a range rate converted from a Doppler frequency of radio waves from a GNSS satellite (hereinafter simply referred to as a "range rate") to the positioning part 100. Other configuration is the same as that of FIG. 2, and therefore description thereof is herein omitted.

Figure 18:
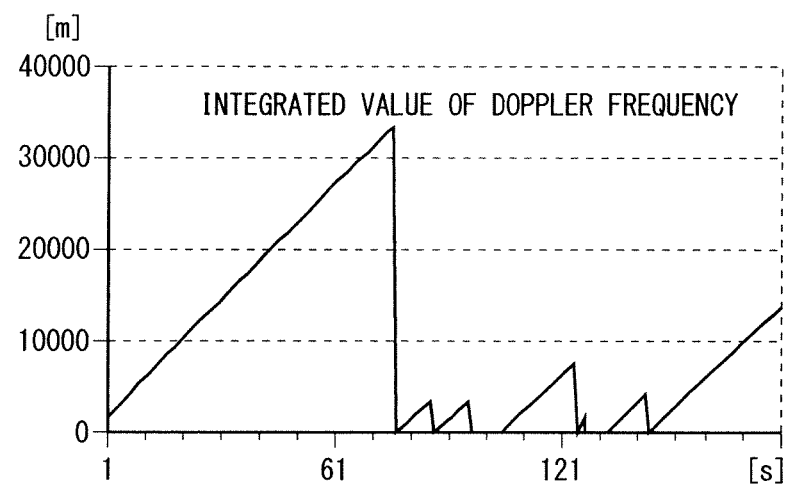
FIG. 18 is a graph illustrating a problem of a cycle slip.

The GNSS receiver 10 can calculate a carrier wave phase by integrating a range rate of radio waves (satellite radio waves) of each GNSS satellite. When a "cycle slip," in which satellite radio waves are momentarily interrupted to lose observed values of a range rate, occurs, as in FIG. 18, the GNSS receiver 10 initializes the carrier wave phase to redo the integration of a range rate each time the cycle slip occurs. Further, a carrier wave phase does not indicate a range between a GNSS satellite and a subject vehicle flawlessly, but contains a bias called a "carrier wave phase bias," and hence such a carrier wave phase bias needs to be detected to correct a carrier wave phase.

In the positioning part 100, concerning GNSS satellites from which a navigation message (ephemeris) has been acquired, the carrier wave phase prediction part 109 predicts a range rate of each GNSS satellite based on the Doppler effect between each GNSS satellite and a subject vehicle. A predicted value of a range rate calculated by the carrier wave phase prediction part 109 is a value not containing a receiver clock drift error. Note that, the carrier wave phase prediction part 109 determines a predicted value of a range rate concerning all of the GNSS satellites from which a navigation message has been acquired, irrespective of a reception condition (received/interrupted) of satellite radio waves.

Further, the receiver clock drift error detection part 110 calculates a receiver clock drift error common to receiving channels of the GNSS receiver 10 from a difference between a predicted value (without a receiver clock drift error) of a range rate calculated by the carrier wave phase prediction part 109 and an observed value (containing a receiver clock drift error) of a range rate of each GNSS satellite obtained by receiving satellite radio waves.

The carrier wave phase calculation part 111 supplements an observed value of a range rate lost due to a cycle slip using a predicted value of a range rate calculated by the carrier wave phase prediction part 109. The observed value of a range rate contains a receiver clock drift error, and hence a value obtained by adding a receiver clock drift error calculated by the receiver clock drift error detection part 110 to a predicted value of a range rate is used at the time of the supplementation using a predicted value of a range rate. Further, the carrier wave phase calculation part 111 determines a carrier wave phase by integrating the supplemented observed value of a range rate, and calculates a carrier wave phase bias.

Here, using FIG. 19 to FIG. 22, specific description is given of operations of the receiver clock drift error detection part 110 and the carrier wave phase prediction part 109. Note that, in the illustration of FIG. 19 to FIG. 21, a Doppler frequency and a receiver clock drift error are converted into a range rate [m/s].

Figure 19:
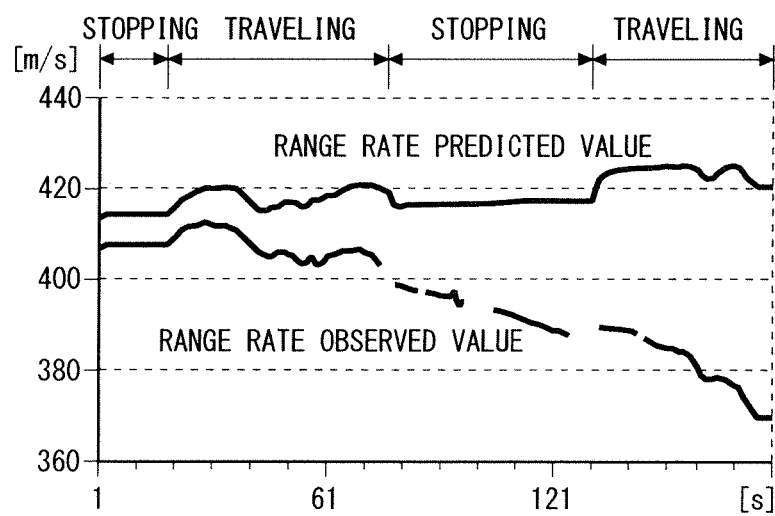
FIG. 19 is a graph illustrating operation of the locator device according to the third embodiment.

For example, as in FIG. 19, in a case where a predicted value and an observed value of a range rate are obtained, the receiver clock drift error detection part 110 determines a receiver clock drift error as in FIG. 20 by determining a difference between the predicted value and the observed value. As in FIG. 21, the carrier wave phase calculation part 111 supplements the loss of an observed value of a range rate using a predicted value of a range rate containing a receiver clock drift error. With this processing, even when a cycle slip occurs, the carrier wave phase calculation part 111 can calculate a carrier wave phase continuously as in FIG. 22 without redoing integration of a range rate.

The carrier wave phase positioning part 112 calculates the subject vehicle position using a value corresponding to a pseudorange determined from a carrier wave phase and its carrier wave phase bias that are calculated by the carrier wave phase calculation part 111 and various errors indicated by a positioning reinforcing signal.

Figure 23:
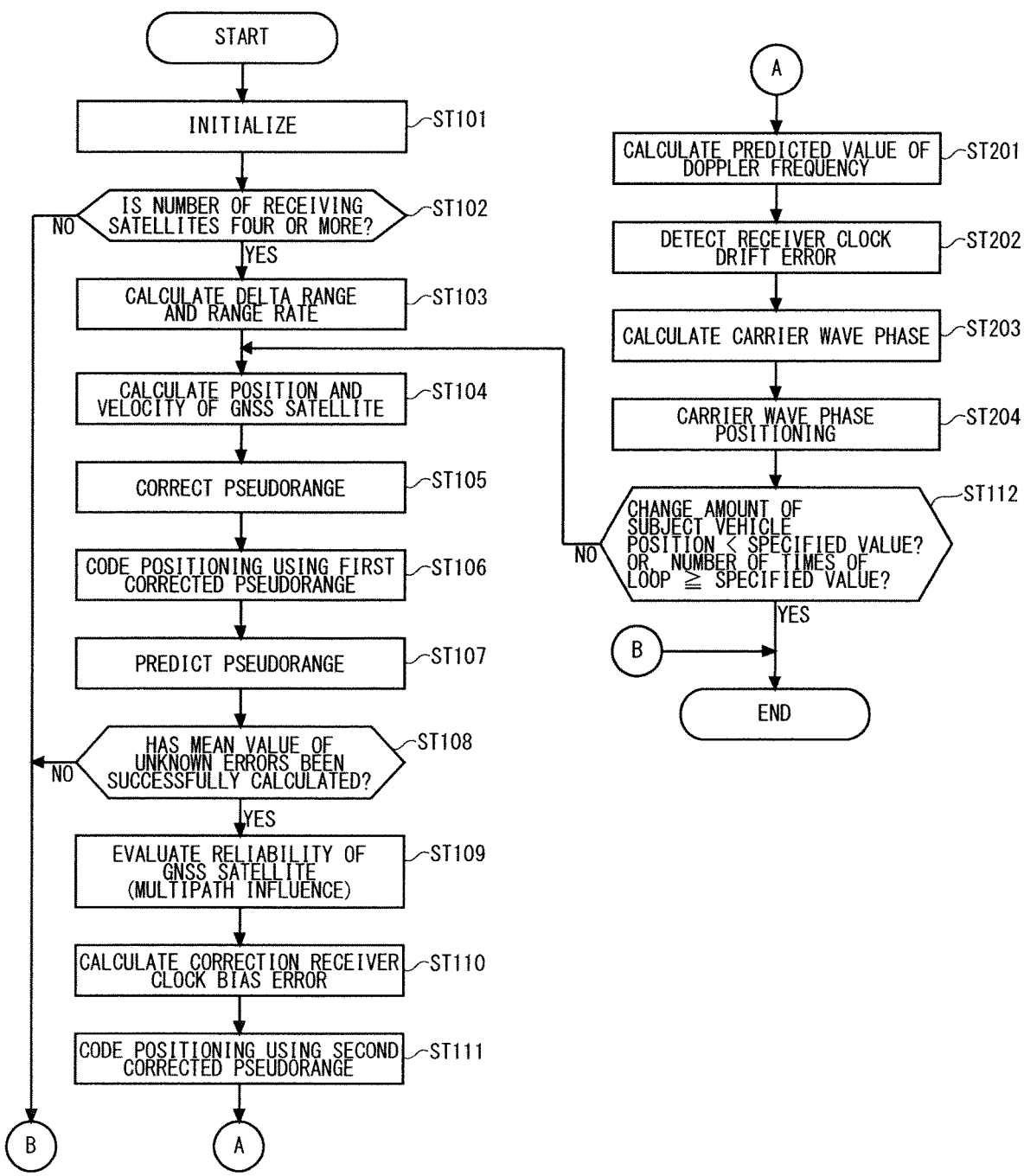
FIG. 23 is a flowchart illustrating positioning processing in the locator device according to the third embodiment.

Next, description is given of positioning processing conducted by the locator device according to the third embodiment. FIG. 23 is a flowchart illustrating the positioning processing. The positioning processing is executed by the positioning part 100 with a predetermined cycle. In the flow of FIG. 23, Steps ST201 to ST204 below are added between Steps ST111 and ST112 of the flow of FIG. 3 (Steps ST201 to ST204 are included in the loop processing of convergence calculation). Processing of other steps is basically the same as that of the first embodiment, and therefore description of only Steps ST201 to ST204 is given herein.

In Step ST201, concerning GNSS satellites from which a navigation message has been acquired, the carrier wave phase prediction part 109 calculates the velocity of each GNSS satellite from the subject vehicle position and the time calculated by the code positioning part 104, and conducts convergence calculation of a range rate calculated from a Doppler frequency of each GNSS satellite using Expression (5) below. Further, the carrier wave phase prediction part 109 recalculates a range rate of each GNSS satellite from the position and the velocity of both of the GNSS satellite and the subject vehicle using Expression (6).

Note that, an initial value of the GNSS receiver clock drift error in the convergence calculation of Expression (5) is calculated from a transition of a GNSS receiver clock bias error calculated by the code positioning correction part 108. During the convergence calculation, however, the carrier wave phase prediction part 109 calculates the GNSS receiver clock drift error together with the subject vehicle velocity.

[Expression 5]

$$\Delta\rho_{rate-s} = LOS_{x\_i} \cdot v_{sx\_i} + LOS_{y\_i} \cdot v_{sy\_i} + LOS_{z\_i} \cdot v_{sz\_i}$$
$$\Delta\rho'_{rate\_i} = \Delta\rho_{rate\_i} - dT_{rcv-drift}$$
$$V_0 = (A^T W A)^{-1}(A^T W) \times \begin{vmatrix} \Delta\rho_{rate-s\_1} - \Delta\rho'_{rate\_1} \\ \Delta\rho_{rate-s\_2} - \Delta\rho'_{rate\_2} \\ \vdots \\ \Delta\rho_{rate-s\_n} - \Delta\rho'_{rate\_n} \end{vmatrix} \quad (5)$$

where $\Delta\rho_{rate-s\_i}$: predicted value of range rate of GNSS satellite [i] (assuming vehicle is stopped) [m/s]

$\Delta\rho_{rate\_i}$: range rate calculated from Doppler frequency of GNSS satellite [i] [m/s]

$dT_{rcv-drift}$: GNSS receiver clock drift error [m/s]

$V_{s\_i}$: velocity of GNSS satellite [i] ($v_{sx\_i}$, $V_{sy\_i}$, $v_{sz\_i}$) [m/s]

$V_0$: subject vehicle velocity ($v_{0x}$, $V_{0y}$, $V_{0z}$) [m/s]

$LOS_i$: line of sight vector (line of sight vector) when viewing GNSS satellite [i] from subject vehicle ($LOS_{x\_i}$, $LOS_{x\_i}$, $LOS_{x\_i}$)

[Expression 6]

$$\Delta\rho_{rate-m\_i} = LOS_{x\_i} \cdot (V_{sx\_i} - V_{0x}) + LOS_{y\_i} \cdot (V_{sy\_i} - V_{0y}) + LOS_{z\_i} \cdot (v_{sz\_i} - v_{0z}) \quad (6)$$

where $\Delta\beta_{rate-m\_i}$: predicted value of range rate of GNSS satellite [i] (assuming vehicle is traveling) [m/s]

$V_{s\_i}$: velocity of GNSS satellite [i] ($v_{sx\_i}$, $v_{sy\_i}$, $v_{sz\_i}$) [m/s]

$V_0$: subject vehicle velocity ($v_{0x}$, $V_{0y}$, $v_{0z}$) [m/s]

$LOS_i$: line of sight vector (line of sight vector) when viewing GNSS satellite [i] from subject vehicle ($LOS_{x\_i}$, $LOS_{x\_i}$, $LOS_{x\_i}$)

In Step ST202, the receiver clock drift error detection part 110 calculates a receiver clock drift error of the GNSS receiver 10 from a difference between a predicted value (not containing a GNSS receiver clock drift error) of a range rate calculated from Expression (6) and an observed value (in which a GNSS receiver clock drift error has not yet been corrected) of a range rate of a GNSS satellite in the process of receiving satellite radio waves. Note that, the GNSS receiver clock drift error can be calculated from Expression (5) as well, and therefore the GNSS receiver clock drift error may be determined using calculation results of Expression (5) as well. In a case of using Expression (6), a receiver clock drift error can be evaluated for individual GNSS satellites, which enables calculation of a receiver clock drift error of the GNSS receiver 10 with omission of a GNSS satellite having a particularly large error. In contrast, in Expression (5), calculation is conducted such that a receiver clock drift error obtained by collectively calculating all of the GNSS satellites becomes minimum, and hence processing of omitting a GNSS satellite having a particularly large error cannot be performed. Therefore, basically, it is preferred that a receiver clock drift error of the GNSS receiver 10 be calculated from a difference between a predicted value of a range rate calculated from Expression (6) and an observed value of a range rate. However, when receiver clock drift errors concerning all of the GNSS satellites are small, Expression (5) may be used with no problem.

In Step ST203, the carrier wave phase calculation part 111 supplements an observed value of a range rate using a value obtained by adding the GNSS receiver clock drift error obtained in Step ST202 to the predicted value of a range rate obtained in Step ST201. Further, the carrier wave phase calculation part 111 calculates a carrier wave phase by integrating an observed value of a range rate after supplementation. Further, when a difference between a two-point range between a GNSS satellite and a subject vehicle and a pseudorange (i.e., first corrected pseudorange in which a receiver clock bias error is corrected) in which various errors indicated by a positioning reinforcing signal and a receiver clock bias error are corrected is a predetermined value or less, the carrier wave phase calculation part 111 calculates a carrier wave phase bias using Expression (7) below.

[Expression 7]

$$\phi_{bias\_i} = \phi_i - \rho_{c\tau\_i} + 2d_{iono} + (d_{\rho noise} - d_{\phi noise}) \quad (7)$$

where
$\phi_{bias\_i}$: carrier wave phase bias of GNSS satellite [i] [m]
$\phi_i$: carrier wave phase of GNSS satellite [i] of GNSS receiver output [m](integrated value of Doppler frequency obtained in Step ST203)
$\Delta\rho_{c\tau\_i}$: pseudorange of GNSS satellite [i] of GNSS receiver output [m]
$d_{iono}$: ionospheric delay error [m]
$d_{\rho noise}$: observational error such as multipath [m]
$d_{\phi noise}$: observational error of carrier wave phase [m]

In Step ST204, the carrier wave phase positioning part 112 calculates a value corresponding to a pseudorange from Expression (8) below, using the carrier wave phase and the carrier wave phase bias that are obtained by integrating a range rate in Step ST203 and various errors indicated by a positioning reinforcing signal. Then, the carrier wave phase positioning part 112 calculates a subject vehicle position from Expression (4) above, using the value corresponding to a pseudorange obtained in Expression (8).

[Expression 8]

$$\phi_i' = \phi_i - \phi_{bias\_i} + dT_{sat\_i} - dT_{rcv-bias} + d_{iono} - d_{trop} - d_{\phi noise} \quad (8)$$

where
$\phi_i'$: carrier wave phase of GNSS satellite [i] in which satellite clock error, ionospheric delay error, and tropospheric delay error are corrected [m]
$\phi_i$: carrier wave phase of GNSS satellite [i] of GNSS receiver output [m]
$\phi_{bias\_i}$: carrier wave phase bias of GNSS satellite [i] [m]
$dT_{sat\_i}$: satellite clock error of GNSS satellite [i] [m]
$dT_{rcv-bias}$: bias error of GNSS receiver clock [m]
$d_{iono}$: ionospheric delay error [m]
$d_{trop}$: tropospheric delay error [m]
$d_{\phi noise}$: observational error of carrier wave phase [m]

In the locator device of the third embodiment, during the positioning using GNSS satellites (satellite positioning), a range rate is predicted from the Doppler effect between each GNSS satellite and a subject vehicle concerning GNSS satellites from which a navigation message has been acquired, irrespective of a reception condition (received/interrupted) of satellite radio waves. Further, a receiver clock drift error can be detected from a difference between an observed value of a range rate of a GNSS satellite in the process of receiving satellite radio waves and a predicted value of a range rate of the GNSS satellite. The receiver clock drift error is an error common to receiving channels of the GNSS receiver 10, that is, an error common to all of the GNSS satellites. Therefore, as long as the locator device can continuously receive radio waves of any of the GNSS satellites, the receiver clock drift error can be continuously detected.

In a case where radio waves of a plurality of GNSS satellites can be continuously received, the receiver clock drift error can be stably detected by determining the mean of receiver clock drift errors calculated concerning each of the GNSS satellites. At that time, when the mean is determined eliminating GNSS satellites whose observed values of a range rate are significantly deviated from predicted values and GNSS satellites whose observed values of a range rate are significantly dispersed, a receiver clock drift error can be obtained with higher precision.

Further, concerning GNSS satellites used for positioning (positioning-use satellites), a range rate (in which a receiver clock drift error has not yet been corrected) output from the GNSS receiver 10 is integrated during reception of satellite radio waves, and a value obtained by adding a receiver clock drift error calculated using another GNSS satellite to a predicted value of a range rate is integrated during interruption of satellite radio waves. Thus, the value of the carrier wave phase (also referred to as an "integrated value of a carrier wave phase") can be obtained continuously (as a continuous waveform).

The positioning part 100 itself separately integrates a range rate instead of using an integrated value of a range rate calculated by the GNSS receiver 10, thereby being capable of uniformly coping with receiving channels of the GNSS receiver 10 concerning receiver clock drift errors, and of addressing a cycle slip with ease.

Further, when a difference between a two-point range between a GNSS satellite and a subject vehicle and a pseudorange in which various errors indicated by a positioning reinforcing signal and a receiver clock bias error are corrected is a predetermined value or less, using Expression (7) above, a carrier wave phase bias can be determined with ease and with high precision using a pseudorange of a GNSS receiver output, an integrated value of a carrier wave phase, and difference of various errors indicated by a positioning reinforcing signal.

Then, a subject vehicle position is calculated using a value corresponding to a pseudorange determined in Expression (8) above from an integrated value of a carrier wave phase and its carrier wave phase bias, various errors indicated by a positioning reinforcing signal, and a receiver clock bias error. Thus, a precise (smooth) subject vehicle position can be obtained. A precise subject vehicle position can be continuously determined owing to carrier wave phase positioning even in a heavy traffic road where a cycle slip is liable to occur and in a road near a structural object that may be a cause of momentary interruption of radio waves, in particular.

Note that, in the third embodiment, description has been given where a carrier wave phase bias is determined for one time. However, when satellite radio waves are continuously received, a mean value of carrier wave phase biases determined at different times may be used, which in turn enables more precise positioning.

Further, in this embodiment, the receiver clock bias error and the receiver clock drift error are separately determined, but the receiver clock bias error and the receiver clock drift error may be regarded as one receiver clock error common to receiving channels of the GNSS receiver 10. That is, the receiver clock bias error and the receiver clock drift error may be converted into one receiver clock error such that the receiver clock bias error and the receiver clock drift error match with each other. With this, each of a pseudorange and a carrier wave phase can be corrected more accurately, which allows a subject vehicle position to be more precise with high precision.

Further, the above description has been given assuming that positioning is conducted receiving radio waves (satellite radio waves) of a certain GNSS satellite. However, the third embodiment is applicable even in a case where all the satellite radio waves are interrupted to be brought into a non-positioning state.

Figure 24:
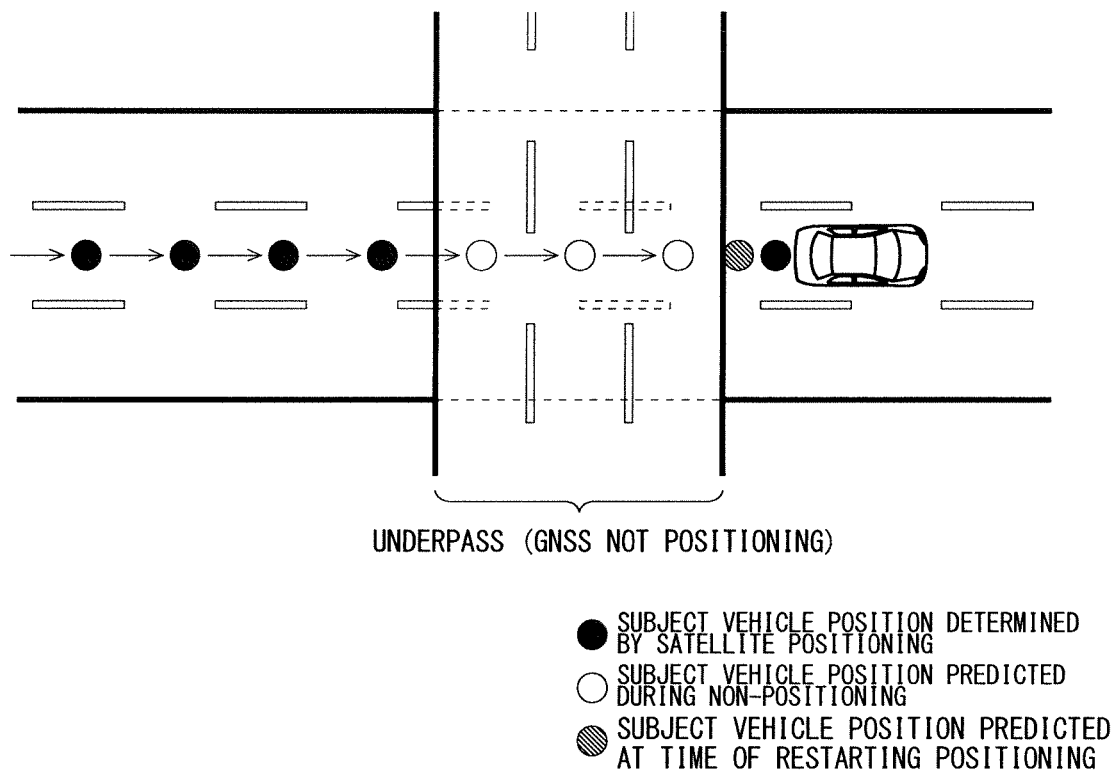
FIG. 24 is a diagram illustrating a countermeasure to a case where all satellite radio waves are interrupted.

For example, as in FIG. 24, when a subject vehicle enters an underpass (such as a grade-separated junction and a tunnel) being a satellite radio wave interrupted area to be brought into a non-positioning state due to interruption of all the satellite radio waves, the carrier wave phase calculation part 111 predicts a subject vehicle position and a subject vehicle velocity during the non-positioning from transition of the subject vehicle position positioned before interruption of satellite radio waves, predicts a receiver clock bias error and a receiver clock drift error during the non-positioning from transition of the receiver clock bias error calculated before the satellite radio waves are interrupted, and predicts a range rate of the GNSS satellites from which a navigation message (ephemeris) has been acquired and integrates the range rate. Then, in a case where such a condition is satisfied that the subject vehicle position and the subject vehicle velocity that are predicted during the non-positioning fall within a certain range with reference to a subject vehicle position and a subject vehicle velocity that are obtained immediately after positioning is restarted and that the receiver clock bias error that is predicted during the non-positioning falls within a certain range with reference to a receiver clock bias error that is obtained immediately after positioning is restarted when the subject vehicle comes out of the underpass and positioning is restarted, the carrier wave phase calculation part 111 validates the integrated value of a range rate predicted during the non-positioning and continues the integration of the range rate. In a case where the above-mentioned condition fails to be satisfied, the integrated value of a range rate predicted during the non-positioning and a carrier wave phase bias are invalidated and the integration is initialized, and a carrier wave phase bias is determined again. With this, even after passing through a place where all the satellite radio waves are momentarily interrupted substantially at one time, precise positioning can be started immediately after positioning is restarted.

Fourth Embodiment

Figure 25:
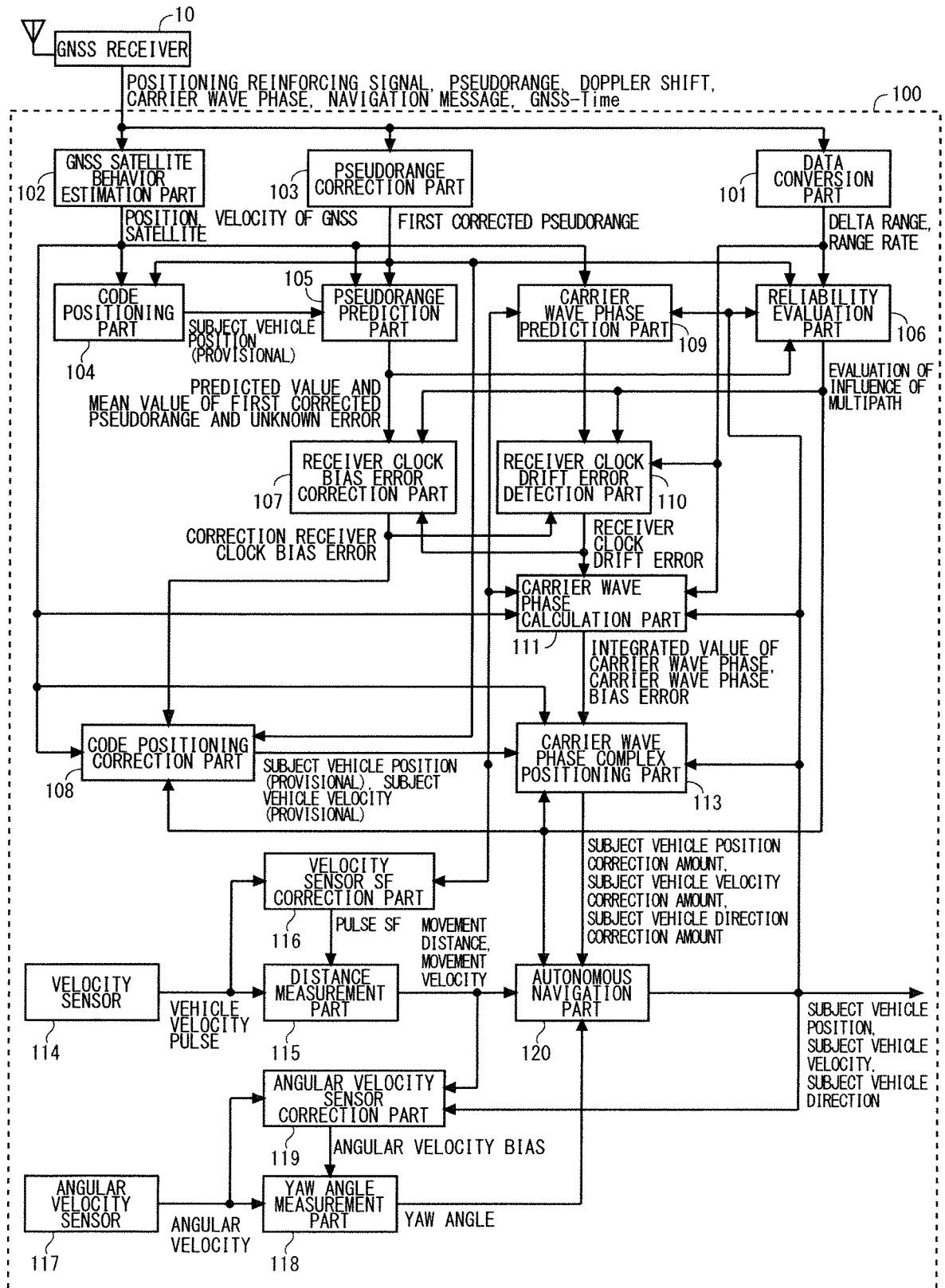
FIG. 25 is a block diagram illustrating a principal configuration of a locator device according to a fourth embodiment.

FIG. 25 is a block diagram illustrating a principal configuration of a locator device (positioning device) according to a fourth embodiment. As compared to the configuration of the third embodiment (FIG. 17), in the positioning part 100, a locator device of FIG. 25 has a configuration in which the carrier wave phase positioning part 112 is replaced with a carrier wave phase complex positioning part 113, and a velocity sensor 114, a distance measurement part 115, a velocity sensor SF correction part 116, an angular velocity sensor 117, a yaw angle measurement part 118, an angular velocity sensor correction part 119, and an autonomous navigation part 120 are further added. Other configuration is the same as that of FIG. 17, and therefore description thereof is herein omitted.

The carrier wave phase complex positioning part 113 conducts complex positioning, where a subject vehicle position, a subject vehicle velocity, and a subject vehicle azimuth that are determined by autonomous navigation are corrected using an observed value (pseudorange, carrier wave phase, and Doppler shift) obtained by the GNSS receiver 10. In this embodiment, using a Kalman filter of eight states having, as quantities of states, subject vehicle position errors ($\varepsilon_{px}$, $\varepsilon_{py}$, $\varepsilon_{pz}$), subject vehicle velocity errors ($\varepsilon_{vx}$, $\varepsilon_{vy}$, $\varepsilon_{vz}$), a receiver clock bias error $\varepsilon_{tbias}$), and a receiver clock drift error $\varepsilon_{tdrift}$, the carrier wave phase complex positioning part 113 observes the subject vehicle position ($p_x$, $p_y$, $p_z$) and the subject vehicle velocity ($v_x$, $v_y$, $v_z$) determined by the autonomous navigation using a carrier wave phase of a GNSS satellite to determine an error (correction amount) of the subject vehicle position, the subject vehicle velocity, and the subject vehicle azimuth determined by the autonomous navigation. Note that, a Kalman filter used by the carrier wave phase complex positioning part 113 is not limited to a Kalman filter of eight states, and another Kalman filter may be used as long as an error of a subject vehicle position and a subject vehicle velocity determined by autonomous navigation can be determined. For example, a technology disclosed in Japanese Patent No. 3875714 etc. relating to a patent application of the inventor of the present invention may be used.

The velocity sensor 114 outputs a pulse signal in accordance with a movement distance of a subject vehicle. The distance measurement part 115 measures the number of pulses of the velocity sensor 114 with a certain cycle, and calculates a movement distance and a velocity of the subject vehicle from the measured value. The velocity sensor SF correction part 116 calculates, from the subject vehicle velocity calculated by satellite positioning and the number of pulses of the velocity sensor 114, a scale factor (SF) coefficient indicating a distance per pulse output by the velocity sensor 114, and corrects a SF coefficient set in the distance measurement part 115.

The angular velocity sensor 117 outputs a signal in accordance with an angular velocity (yaw rate) of the subject vehicle, with reference to the vertical direction of a casing of the locator device as its sensor detection axis. The yaw angle measurement part 118 measures the output of the angular velocity sensor 117 with a certain cycle, and calculates a yaw angle of the subject vehicle from the measurement results. The angular velocity sensor correction part 119 determines an output bias (yaw rate bias) of the angular velocity sensor 117.

The autonomous navigation part 120 calculates a subject vehicle position, a subject vehicle velocity, and a subject vehicle azimuth with autonomous navigation. That is, the autonomous navigation part 120 determines a movement vector for every certain cycle using the movement distance of the subject vehicle and the yaw angle of the subject vehicle, updates a subject vehicle position by adding the movement vector to a previously measured subject vehicle position, and calculates a subject vehicle velocity and a subject vehicle azimuth from the movement vector. Further, the autonomous navigation part 120 also corrects the subject vehicle position, the subject vehicle velocity, and the subject vehicle azimuth so as to correct each error calculated by the carrier wave phase complex positioning part 113.

Figure 26:
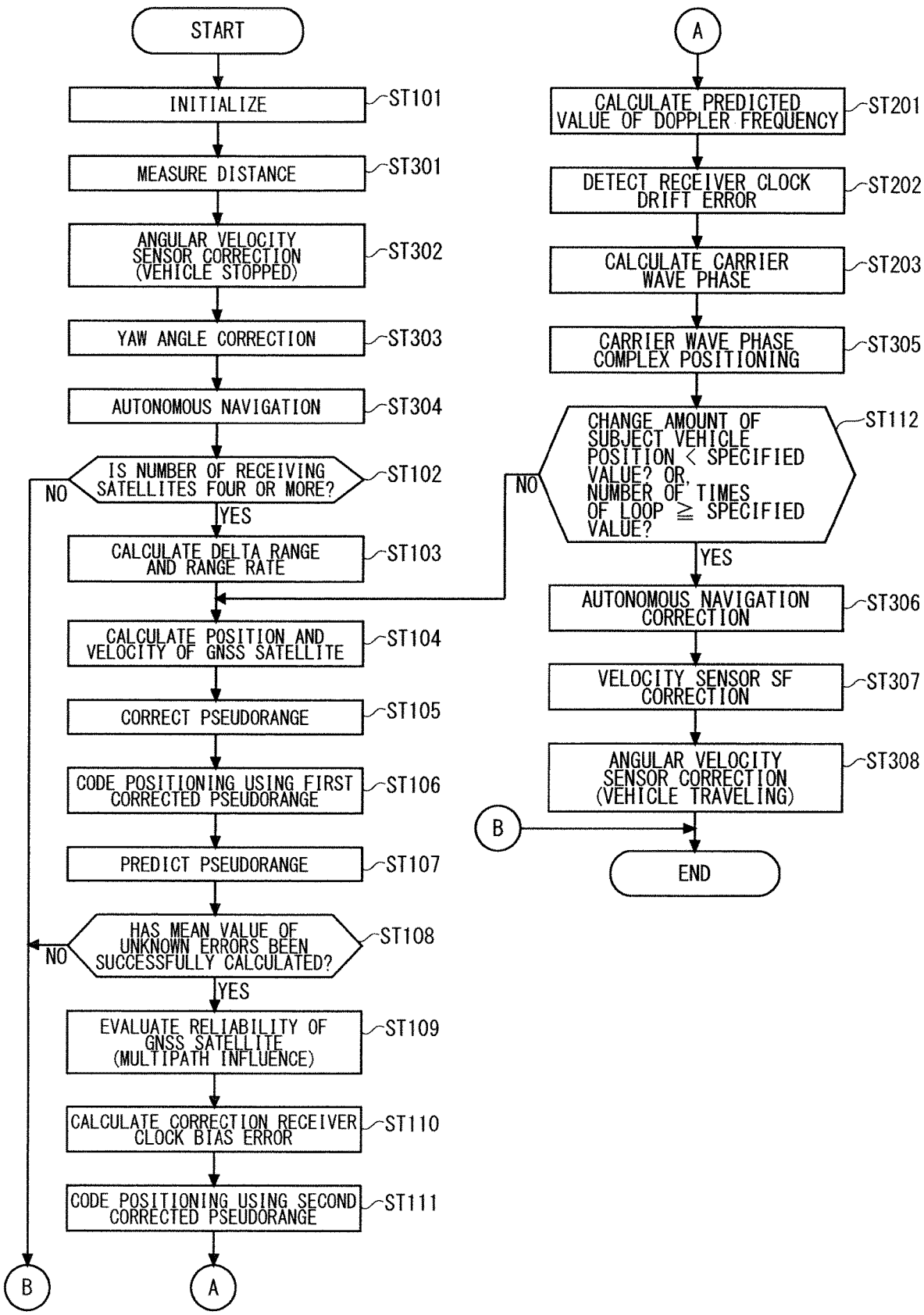
FIG. 26 is a flowchart illustrating positioning processing in the locator device according to the fourth embodiment.

Next, description is given of positioning processing conducted by the locator device according to the fourth embodiment. FIG. 26 is a flowchart illustrating the positioning processing. The positioning processing is executed by the positioning part 100 with a predetermined cycle. As compared to the flow of FIG. 23, in the flow of FIG. 26, Steps ST301 to ST304 below are added between Steps ST101 and ST102, Step ST204 is replaced with Step ST305 below, and Steps ST306 to ST308 below are added after Step ST112 (Step ST305 is included in the loop processing of convergence calculation). Processing of other steps is basically the same as that of the third embodiment, and therefore description of only the steps of performing different processing from the third embodiment is given herein.

In Step ST301 next to Step ST101, the distance measurement part 115 calculates a movement distance of the subject vehicle by multiplying the number of pulses of the velocity sensor 114 for every certain cycle by a SF coefficient, and calculates the velocity of the subject vehicle by integrating the pulse for every cycle above using a low-pass filter.

Step ST302 is processing performed during the time when the subject vehicle stops. In Step ST302, the angular velocity sensor correction part 119 determines whether the subject vehicle is currently stopped from the movement distance of the subject vehicle obtained in Step ST301, and in a case where the subject vehicle is currently stopped, the angular velocity sensor correction part 119 determines a mean value of outputs of the angular velocity sensor 117 to set the mean value as an output bias of the angular velocity sensor 117.

In Step ST303, the yaw angle measurement part 118 calculates the yaw angle of the subject vehicle by subtracting the output bias set in Step ST302 from the output of the angular velocity sensor 117 measured for every certain cycle.

In Step ST304, the autonomous navigation part 120 calculates a subject vehicle position, a subject vehicle velocity, and a subject vehicle azimuth with autonomous navigation. That is, the autonomous navigation part 120 determines a movement vector for every certain cycle using the movement distance of the subject vehicle obtained in Step ST301 and the yaw angle of the subject vehicle obtained in Step ST303, updates a subject vehicle position by adding the movement vector to the subject vehicle position calculated in a previous positioning cycle, and calculates a subject vehicle velocity and a subject vehicle azimuth from the movement vector.

In subsequent Steps ST102 to ST108, the same processing as that of the third embodiment (the first embodiment) is performed.

In Step ST109, the reliability evaluation part 106 confirms whether or not a difference between an observed value and a predicted value of the first corrected pseudorange, a difference between a delta range and a range rate calculated by the data conversion part 101, and a difference between a subject vehicle position obtained by code positioning and a subject vehicle position obtained from autonomous navigation exceed respective threshold values, thereby evaluating influence of multipath of each GNSS satellite.

In subsequent Steps ST110 and ST111, the same processing as that of the third embodiment (or the first embodiment) is performed.

In Step ST201, concerning GNSS satellites from which a navigation message has been acquired, using the time calculated by the code positioning correction part 108 and the subject vehicle position and the subject vehicle velocity that are calculated by the autonomous navigation part 120, the carrier wave phase prediction part 109 conducts convergence calculation of a range rate of each GNSS satellite obtained by the Doppler effect between each GNSS satellite and the subject vehicle using Expression (5) above. Further, from the position and the velocity of both of the GNSS satellite and the subject vehicle, a range rate is recalculated using Expression (6) above.

In subsequent Steps ST202 and ST203, the same processing as that of the third embodiment is performed.

In Step ST305 next to Step ST203, using a Kalman filter of eight states having, as quantities of states, subject vehicle position errors ($\varepsilon_{px}$, $\varepsilon_{py}$, $\varepsilon_{pz}$), subject vehicle velocity errors ($\varepsilon_{vx}$, $\varepsilon_{vy}$, $\varepsilon_{vz}$), a receiver clock bias error $\varepsilon_{tbias}$), and a receiver clock drift error $\varepsilon_{tdrift}$, the carrier wave phase complex positioning part 113 observes the subject vehicle position ($p_x$, $p_y$, $p_z$) and the subject vehicle velocity ($v_x$, $v_y$, $v_z$) determined by the autonomous navigation using a carrier wave phase of a GNSS satellite to determine an error of the subject vehicle position, the subject vehicle velocity, and the subject vehicle azimuth determined by the autonomous navigation.

Then, in a case where the processing exits from the loop processing of the convergence calculation in Step ST112, Steps ST306 to ST308 below are performed.

In Step ST306, the autonomous navigation part 120 corrects the subject vehicle position, the subject vehicle velocity, and the subject vehicle azimuth determined in Step ST303, using each error of the subject vehicle position, the subject vehicle velocity, and the subject vehicle azimuth calculated by the carrier wave phase complex positioning part 113.

In Step ST307, the velocity sensor SF correction part 116 calculates a SF coefficient from a value of the subject vehicle velocity calculated by the code positioning correction part 108 and the number of pulses output by the velocity sensor 114 with a certain cycle, and corrects the SF coefficient set in the distance measurement part 115. As a specific example of a method of calculating a SF coefficient, for example, a method disclosed in Japanese Patent No. 5606656 relating to a patent application of the inventor of the present invention may be used.

Step ST308 is processing performed during the time when the subject vehicle is traveling. In Step ST308, the angular velocity sensor correction part 119 corrects a bias of the angular velocity sensor 117 from a difference between an azimuth obtained by integrating a yaw angle of each time with reference to a subject vehicle azimuth at arbitrary time as an initial value and a subject vehicle azimuth corrected by the carrier wave phase complex positioning part 113. As a specific example of a method of correcting a bias of the angular velocity sensor 117, methods disclosed in Japanese Patent No. 3321096, Japanese Patent No. 3727489, etc. relating to patent applications of the inventor of the present invention may be used.

In the fourth embodiment, a receiver clock bias error is calculated based a two-point range between a subject vehicle position and a position of a GNSS satellite determined by autonomous navigation, and an error of a subject vehicle position, a subject vehicle velocity, and a subject vehicle azimuth that are determined by autonomous navigation is corrected based on an observed value (pseudorange, carrier wave phase, Doppler shift) obtained by the GNSS receiver 10. Therefore, stable positioning can be continued even in a satellite radio wave interrupted area such as a tunnel and in a road including a multipath environment. Further, precise positioning can be conducted promptly after restarting to receive satellite radio waves and being exposed under open sky.

Fifth Embodiment

Figure 27:
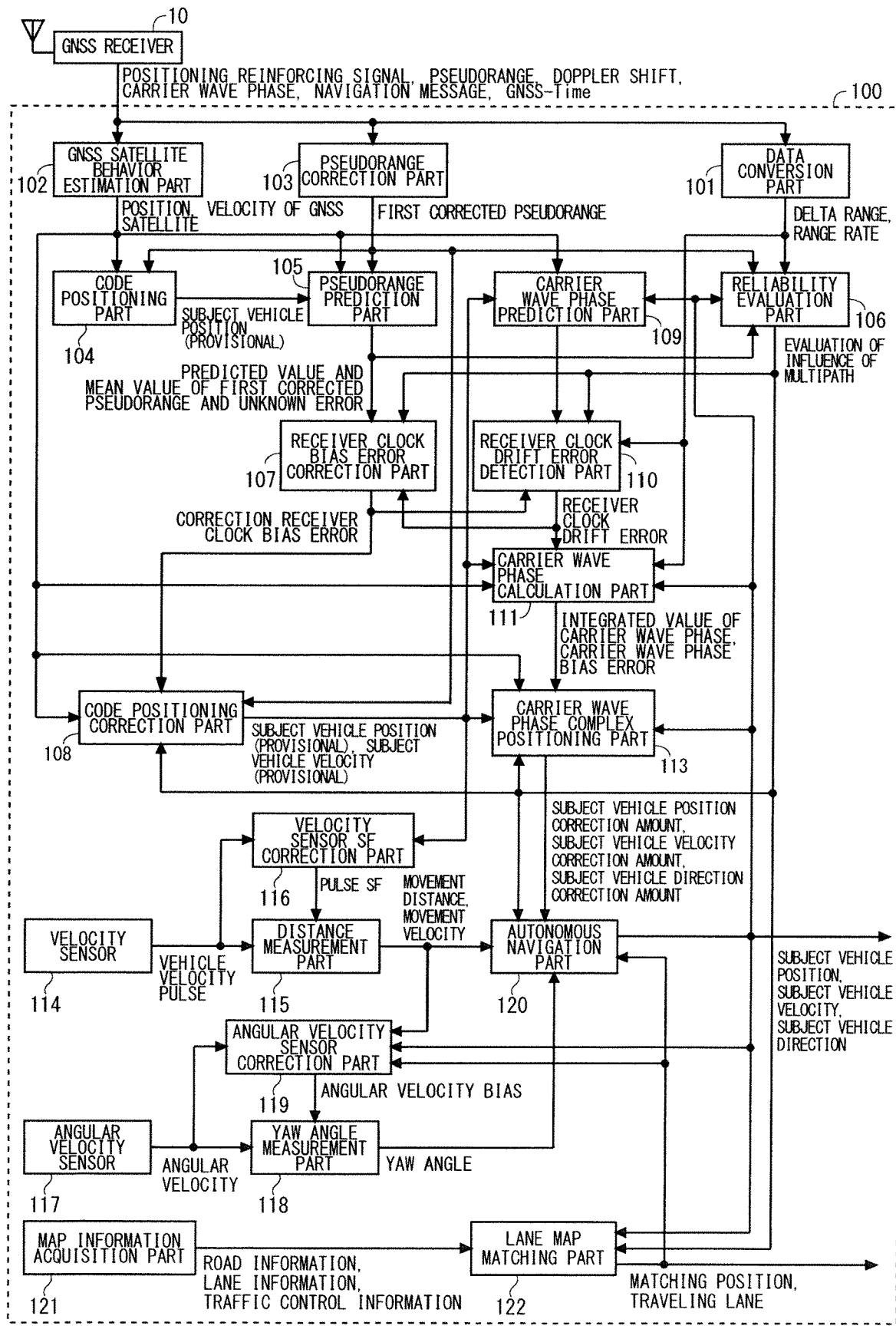
FIG. 27 is a block diagram illustrating a principal configuration of a locator device according to a fifth embodiment.

FIG. 27 is a block diagram illustrating a principal configuration of a locator device (positioning device) according to a fifth embodiment. As compared to the configuration of the fourth embodiment (FIG. 25), a locator device of FIG. 27 has a configuration in which a map information acquisition part 121 and a lane map matching part 122 are added to the positioning part 100. Other configuration is the same as that of FIG. 25, and therefore description thereof is herein omitted.

The map information acquisition part 121 acquires map information of at least the vicinity of a subject vehicle from a map database (not shown) inside or outside the locator device. A map acquired by the map information acquisition part 121 is a highly precise map, which includes data of the number of lanes in each road, data of the shape of each lane (node coordinates, link (lane link), and lane width), data of traffic control (such as traffic regulation information) in each traffic lane, and the like. Further, the map information also includes information of absolute position precision and an updated date of each road.

The lane map matching part 122 conducts map matching (lane map matching) in a unit of a lane of a road. That is, from the high-precision map acquired by the map information acquisition part 121 and the subject vehicle position and the subject vehicle azimuth that are calculated by the autonomous navigation part 120, the lane map matching part 122 detects a lane (traveling lane) in which the subject vehicle travels and identifies a subject vehicle position and a subject vehicle azimuth on the traveling lane.

In the fifth embodiment, when the lane map matching part 122 detects an error in each of the subject vehicle position and the subject vehicle azimuth, the autonomous navigation part 120 corrects the subject vehicle position and the subject vehicle azimuth based on the error in addition to performing the operation of the fourth embodiment. Further, when an error of an output bias (i.e., error at the zero point) of the angular velocity sensor 117 is calculated by the lane map matching part 122, the angular velocity sensor correction part 119 corrects the output bias of the angular velocity sensor 117 based on the error in addition to performing the operation of the fourth embodiment. Further, using the subject vehicle position on a traveling lane identified by the lane map matching part 122, the reliability evaluation part 106 evaluates reliability (influence of multipath) of absolute precision of the subject vehicle position determined by satellite positioning in addition to performing the operation of the fourth embodiment.

Figure 28:
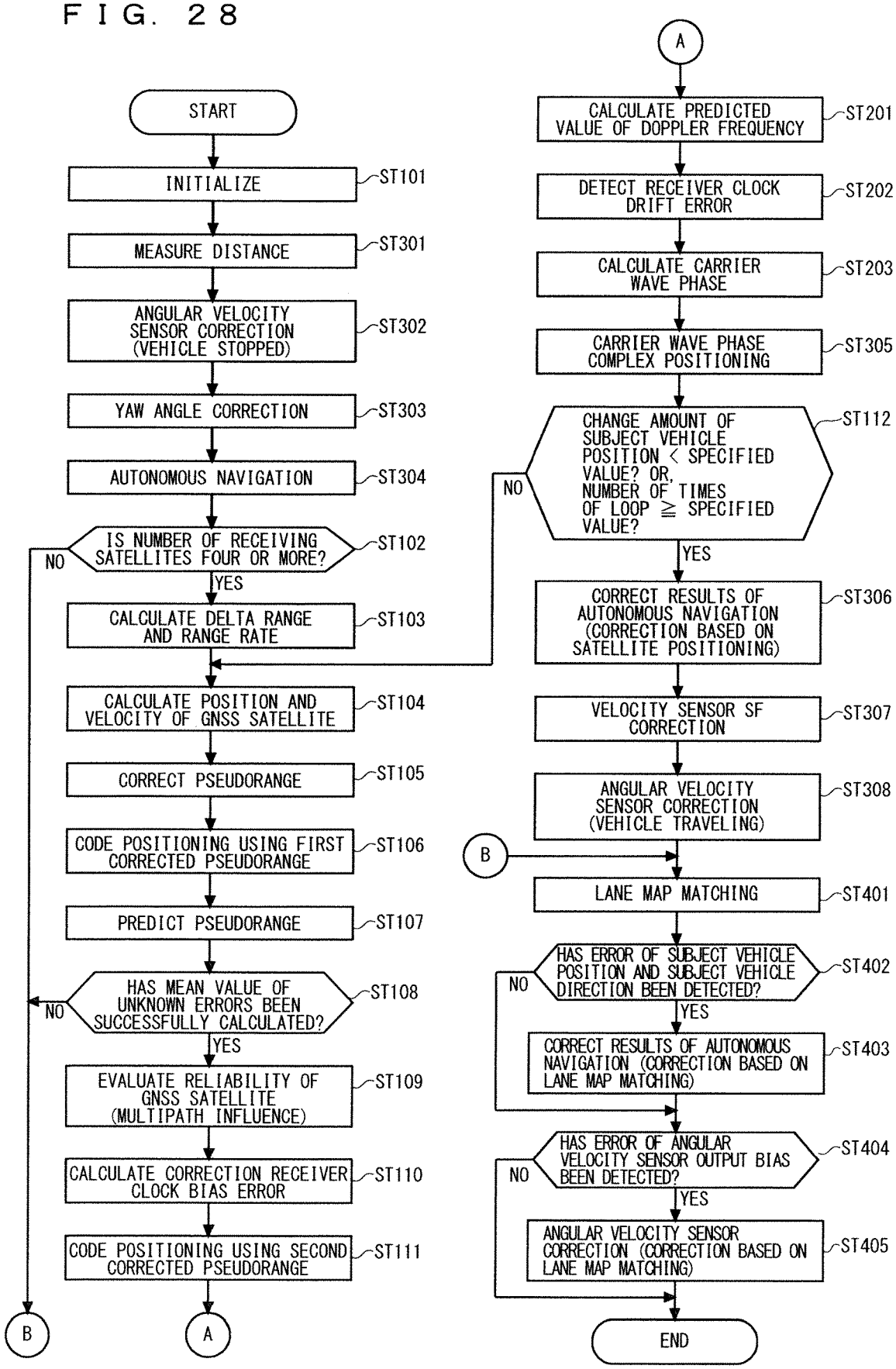
FIG. 28 is a flowchart illustrating positioning processing in the locator device according to the fifth embodiment.

Next, description is given of positioning processing conducted by the locator device according to the fourth embodiment. FIG. 28 is a flowchart illustrating the positioning processing. The positioning processing is executed by the positioning part 100 with a predetermined cycle. As compared to the flow of FIG. 26, in the flow of FIG. 28, Steps ST401 to ST405 below are added after Step ST108. Processing of other steps is basically the same as that of the fourth embodiment, and therefore description of only the steps of performing different processing from the fourth embodiment is given herein.

Figure 29:
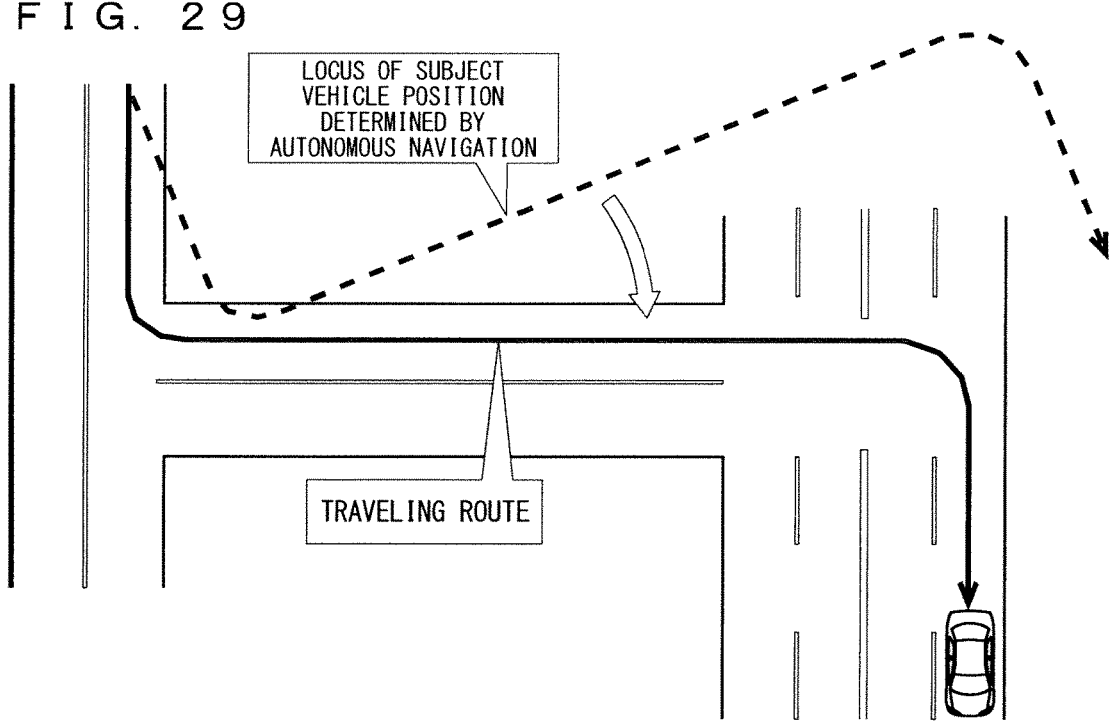
FIG. 29 is a diagram illustrating an example of lane map matching processing.
Figure 30:
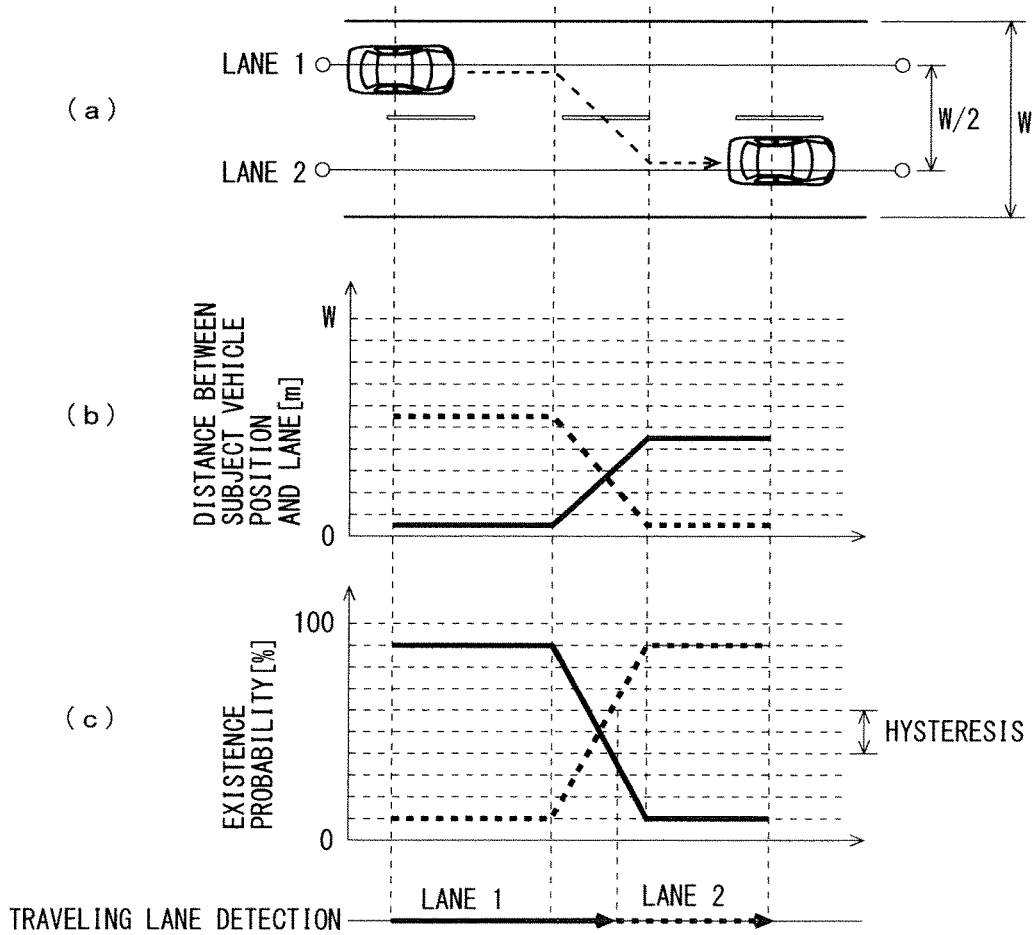
FIG. 30 is a diagram illustrating an example of lane map matching processing.

In Step ST401, using a pattern matching technology, the lane map matching part 122 corrects the locus of the subject vehicle position determined by autonomous navigation so as to be overlapped with the actual traveling route of the subject vehicle as in FIG. 29. At this time, the lane map matching part 122 calculates existence probability of the subject vehicle in a unit of a lane to detect a traveling lane of the subject vehicle, and determines a subject vehicle position within the traveling lane. For example, as shown in FIG. 30, a distance between a subject vehicle position and a position of each lane (e.g., the center of a lane) is calculated, and a lane with the distance closer to the subject vehicle position is determined to be higher in existence probability of a subject vehicle, thus determining a lane with the highest existence probability as a traveling lane. Further, usually, a traveling lane is not changed very often, and therefore transition of traveling lanes may be determined with hysteresis. As a specific example of processing for determining a traveling lane, for example, technologies disclosed in Japanese Patent No. 3559142, Japanese Patent No. 3568768, etc. relating to patent applications of the inventor of the present invention may be used.

Figure 31:
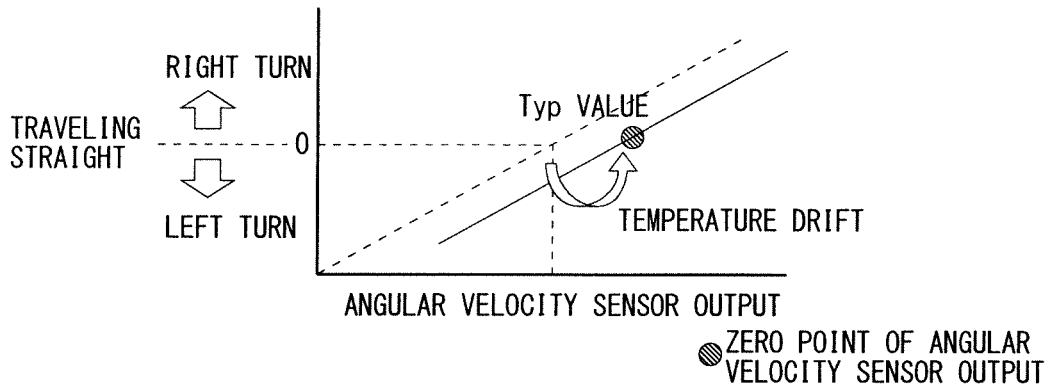
FIG. 31 is a diagram illustrating a problem of a bias error of an angular velocity sensor output.
Figure 32:
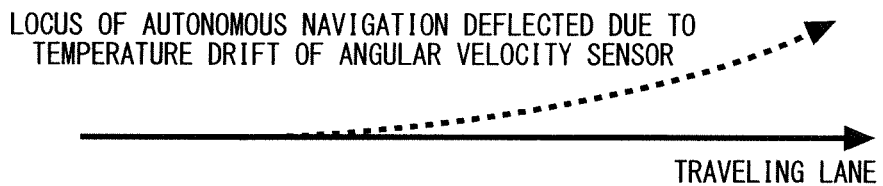
FIG. 32 is a diagram illustrating deviation of a subject vehicle position caused by the bias error of the angular velocity sensor output.

Further, as in FIG. 31, in a case where a drift (temperature drift) is generated in an output bias (zero point) of the angular velocity sensor 117 due to a temperature change, an error is also generated in a yaw angle calculated by the yaw angle measurement part 118 due to the temperature drift. In such a case, especially in a tunnel area or the like where satellite radio waves cannot be received, an error in a subject vehicle azimuth grows larger due to an error in a yaw angle. Thus, even when the subject vehicle travels in a traveling lane, as in FIG. 32, a subject vehicle azimuth may be deviated from a lane link azimuth of the traveling lane, making a subject vehicle position determined by autonomous navigation fall out of the traveling lane. However, a temperature drift of a yaw angle is approximately ±0.1 degree/s at most, and hence deviation of a subject vehicle position due to a temperature drift of a yaw angle and a change of a subject vehicle position due to actual lane change can be distinguished.

Therefore, in a case where a subject vehicle azimuth determined by autonomous navigation is determined to fall out of a traveling lane due to a temperature drift, the lane map matching part 122 compares the subject vehicle azimuth and the lane link azimuth of the traveling lane to calculate an error of the subject vehicle position and the subject vehicle azimuth determined by autonomous navigation with respect to the lane link.

In Step ST402, the autonomous navigation part 120 confirms whether or not an error of the subject vehicle position and the subject vehicle azimuth determined by autonomous navigation is detected by the lane map matching part 122. The processing proceeds to Step ST403 when an error is detected, and the processing proceeds to Step ST404 when an error is not detected.

In Step ST403, the autonomous navigation part 120 corrects the subject vehicle position and the subject vehicle azimuth determined by autonomous navigation based on the error of the subject vehicle position and the subject vehicle azimuth calculated by the lane map matching part 122.

In Step ST404, the angular velocity sensor 117 confirms whether or not an error of an output bias (yaw rate bias) of the angular velocity sensor 117 is detected by the lane map matching part 122. The processing proceeds to Step ST405 when an error is detected, and the current positioning processing is ended when an error is not calculated.

In Step ST405, the angular velocity sensor correction part 119 corrects the output bias of the angular velocity sensor 117 based on the error of the yaw rate bias calculated by the lane map matching part 122. Through the processing of Steps ST403 and ST405, as in FIG. 33, the subject vehicle azimuth is corrected so as to follow a lane link of the traveling lane.

Figure 33:
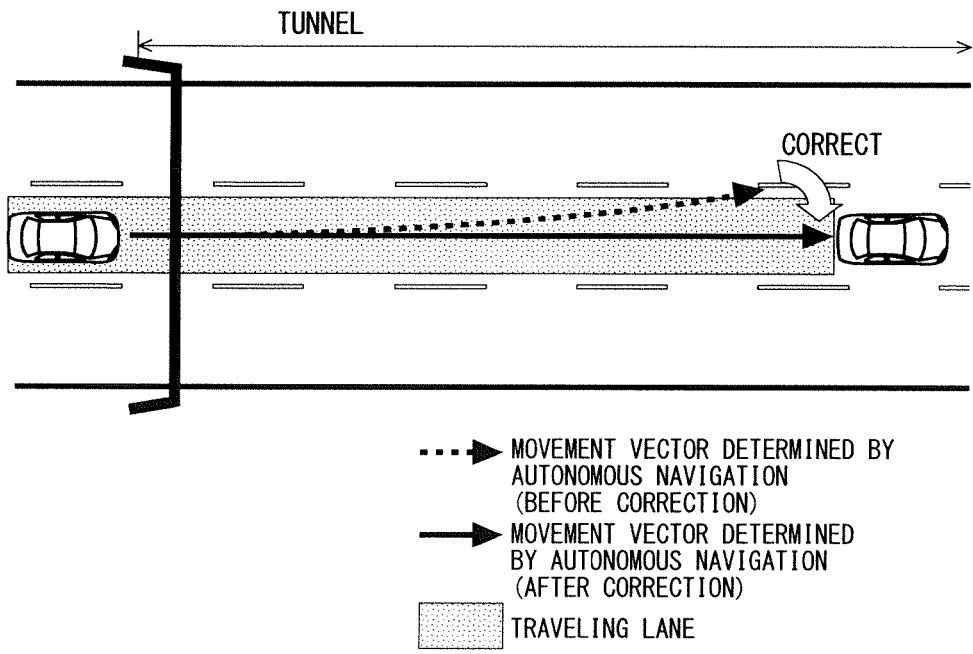
FIG. 33 is a diagram illustrating correction of deviation of a subject vehicle position caused by the bias error of the angular velocity sensor output.

As in the above description, usual traveling lane change and a temperature drift of an output bias of the angular velocity sensor 117 have an obvious difference in the magnitude of the angular velocity, and hence, with use of a high-precision map having absolute precision of approximately 50 cm, a traveling lane of a subject vehicle can be determined using at least position information obtained by autonomous navigation. Therefore, in the fifth embodiment, even when a temperature drift is generated in an output bias of the angular velocity sensor 117, the subject vehicle position and the subject vehicle azimuth that are determined by autonomous navigation and the output bias of the angular velocity sensor 117 are corrected such that the subject vehicle position determined by autonomous navigation is updated within a range not fallen out of the traveling lane while the subject vehicle travels within the traveling lane. With this, as illustrated in FIG. 33, the subject vehicle azimuth is corrected so as to follow a lane link of a traveling lane, and therefore the precision of the subject vehicle position determined by autonomous navigation can further be enhanced. As a result, in a satellite radio wave interrupted area such as a tunnel, a traveling distance in which a traveling lane of a subject vehicle can be correctly detected can be significantly extended. Further, even in the outside of a satellite radio wave interrupted area, a traveling distance in which a traveling lane of a subject vehicle can be correctly detected can be significantly extended in a case where the precision of satellite positioning is reduced or the like.

Figure 34:
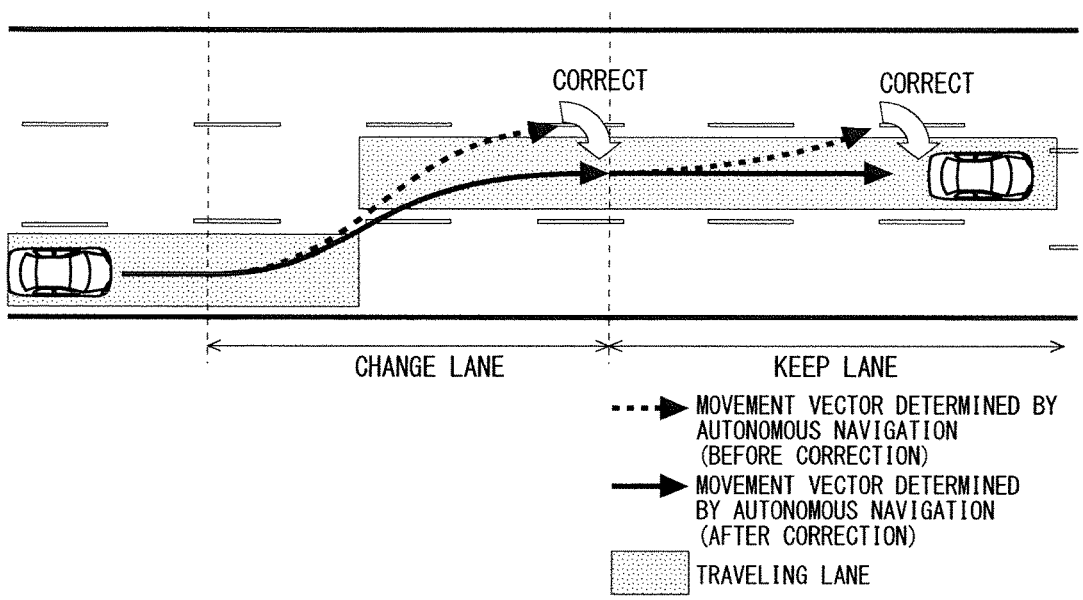
FIG. 34 is a diagram illustrating correction of deviation of a subject vehicle position caused by the bias error of the angular velocity sensor output.

Note that, in the above description, description has been given of a case where corrections are made to a subject vehicle position and a subject vehicle azimuth that are determined by autonomous navigation and also to an output bias of the angular velocity sensor 117 under a state in which a subject vehicle travels in one traveling lane. However, such corrections are made even in a case where a subject vehicle is determined to be changing lanes. As illustrated in FIG. 34, for example, when a subject vehicle is determined to be changing lanes, each of the above corrections is made with reference to both a traveling lane before the lane change and a traveling lane after the lane change. That is, each of the above corrections is made such that the subject vehicle position determined by autonomous navigation is updated to be a position falling within either of a traveling lane before the lane change or a traveling lane after the lane change. Further, such a configuration may be employed that the subject vehicle position determined by autonomous navigation is updated to be a position falling within a traveling lane or its adjacent lane in a case where clear determination cannot be made as to whether the subject vehicle has changed lanes.

Figure 35:
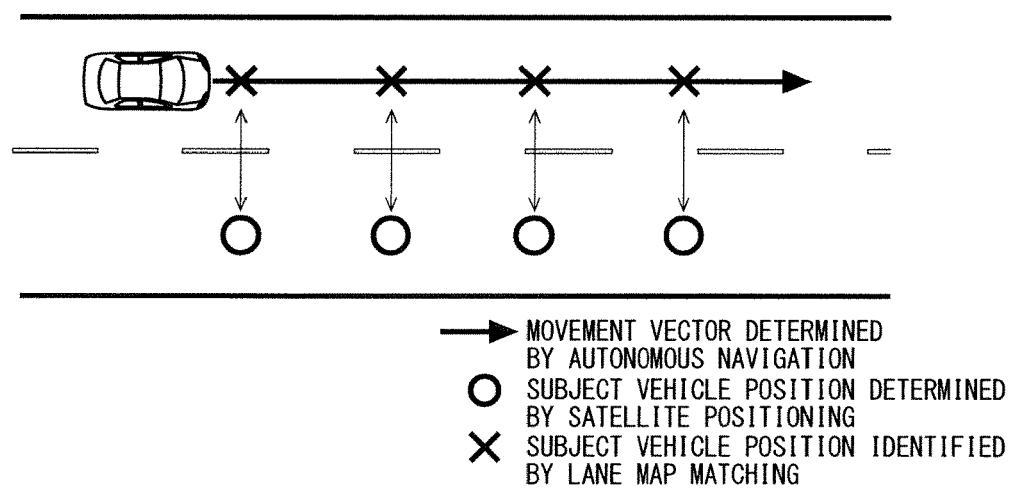
FIG. 35 is a diagram illustrating a countermeasure to a time when positional deviation of a subject vehicle position is constantly generated in a road area having low map precision.

Further, in the above description, absolute precision of roads in map information acquired by the map information acquisition part 121 is assumed to be sufficiently high. However, for example, it is conceivable that the map information also contains information of an area having low absolute precision of roads. In a state where a subject vehicle travels in an area having low absolute precision of map information, the subject vehicle position (traveling lane) determined by autonomous navigation may be constantly (at all time in a fixed manner) deviated from the subject vehicle position determined by satellite positioning as in FIG. 35, even under open sky without multipath with a satisfactory arrangement state of GNSS satellites and with various errors being satisfactorily corrected. Therefore, such a configuration may be employed that the lane map matching part 122 learns a constant difference (positional deviation) between the subject vehicle position determined by autonomous navigation and the subject vehicle position determined by satellite positioning when the subject vehicle travels in an area having low map precision. That is, when the subject vehicle travels in an area having low map precision, the lane map matching part 122 observes positional deviation between the subject vehicle position determined by autonomous navigation and the subject vehicle position determined by satellite positioning continuously for a certain period of time, and then, in a case where constant positional deviation is generated, the lane map matching part 122 determines that such positional deviation is caused by an error of the map information, and conducts lane map matching in consideration of such constant positional deviation. With this, flexible lane map matching can be conducted even when there is a road area having low precision.

Figure 36:
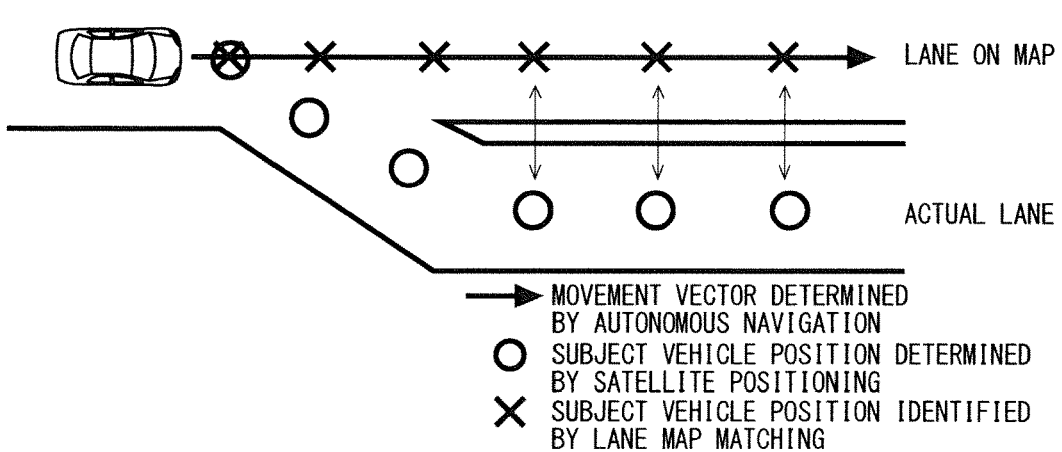
FIG. 36 is a diagram illustrating a countermeasure to a time when positional deviation of a subject vehicle position is constantly generated in a road area where map information is not the latest.

Further, with the above method of making the carrier wave phase positioning part 112 learn constant positional deviation, for example, such a case can also be addressed that a map acquired by the map information acquisition part 121 is not updated into the latest information and thus a lane on the map and an actual lane (extended lane due to road improvement or the like, for example) do not match as illustrated in FIG. 36. That is, when the subject vehicle travels in an area having old map information (not updated for a certain period of time of more), the lane map matching part 122 observes positional deviation between the subject vehicle position determined by autonomous navigation and the subject vehicle position determined by satellite positioning continuously for a certain period of time, and then, in a case where constant positional deviation is generated, the lane map matching part 122 determines that such positional deviation is caused by an error of the map information, and conducts lane map matching in consideration of such constant positional deviation. With this, flexible lane map matching can be conducted even when old information is contained in map information.

Figure 37A:
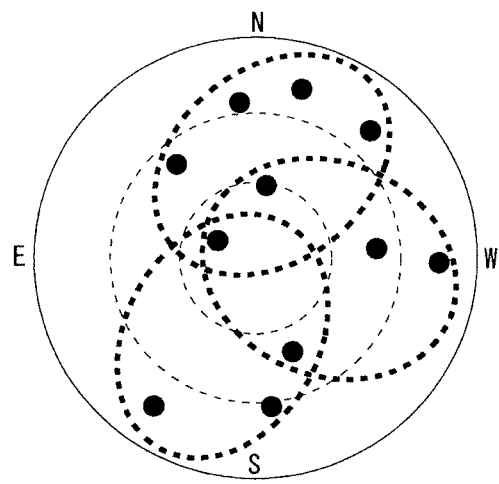
FIGS. 37A and 37B are each a diagram illustrating a countermeasure to a case where deviation is generated in a subject vehicle position determined by satellite positioning, due to a combination of positioning-use satellites.
Figure 37B:
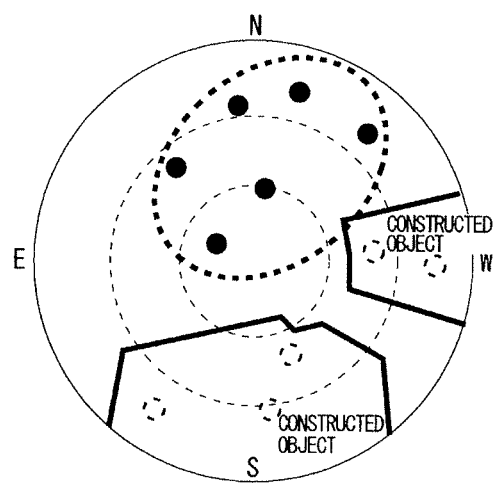
Figure 38:
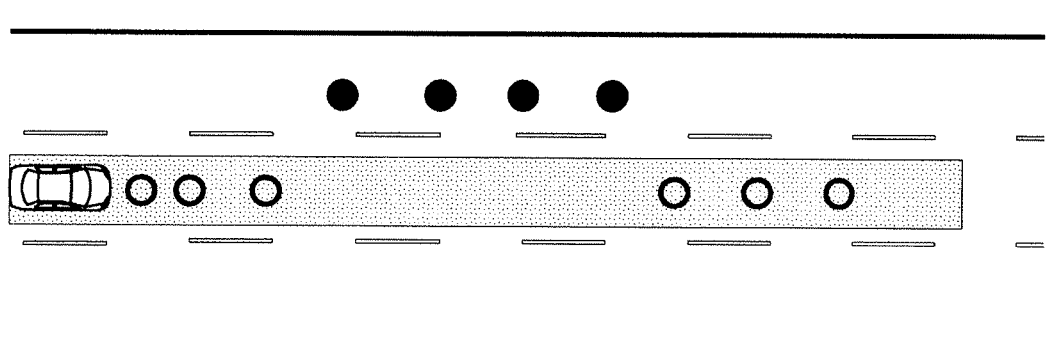
FIG. 38 is a diagram illustrating a countermeasure to a case where deviation is generated in a subject vehicle position determined by satellite positioning, due to a combination of positioning-use satellites.

Further, arbitrary GNSS satellites (particularly preferably GNSS satellites with a low angle of elevation that are liable to be blocked by a constructed object) are eliminated from positioning-use satellites, and a deviation amount of a subject vehicle position is confirmed for each of the combinations of positioning-use satellites in advance (FIG. 37A). Then, in a case where any of the confirmed combinations of the positioning-use satellites survives (FIG. 37B) at the time when a part of the GNSS satellites is incapable of actual use due to a constructed object or the like, the carrier wave phase complex positioning part 113 may calculate an error of the subject vehicle position determined by satellite positioning in consideration of the deviation amount confirmed in advance. When a positioning-use satellite changes, deviation is generated in subject vehicle positions to be positioned as in FIG. 38. However, the subject vehicle positions can be correctly determined on condition that the deviation amount is already known. Further, particularly in a case where deviation is generated in a subject vehicle position determined by satellite positioning due to arrangement of GNSS satellites in spite of being under open sky, the carrier wave phase complex positioning part 113 may switch a complex positioning mode from a tight coupling mode to a loose coupling mode, thereby reducing influence of deviation over the subject vehicle position determined by satellite positioning and enabling suppression in reduction of estimation precision of the subject vehicle position.

Figure 39:
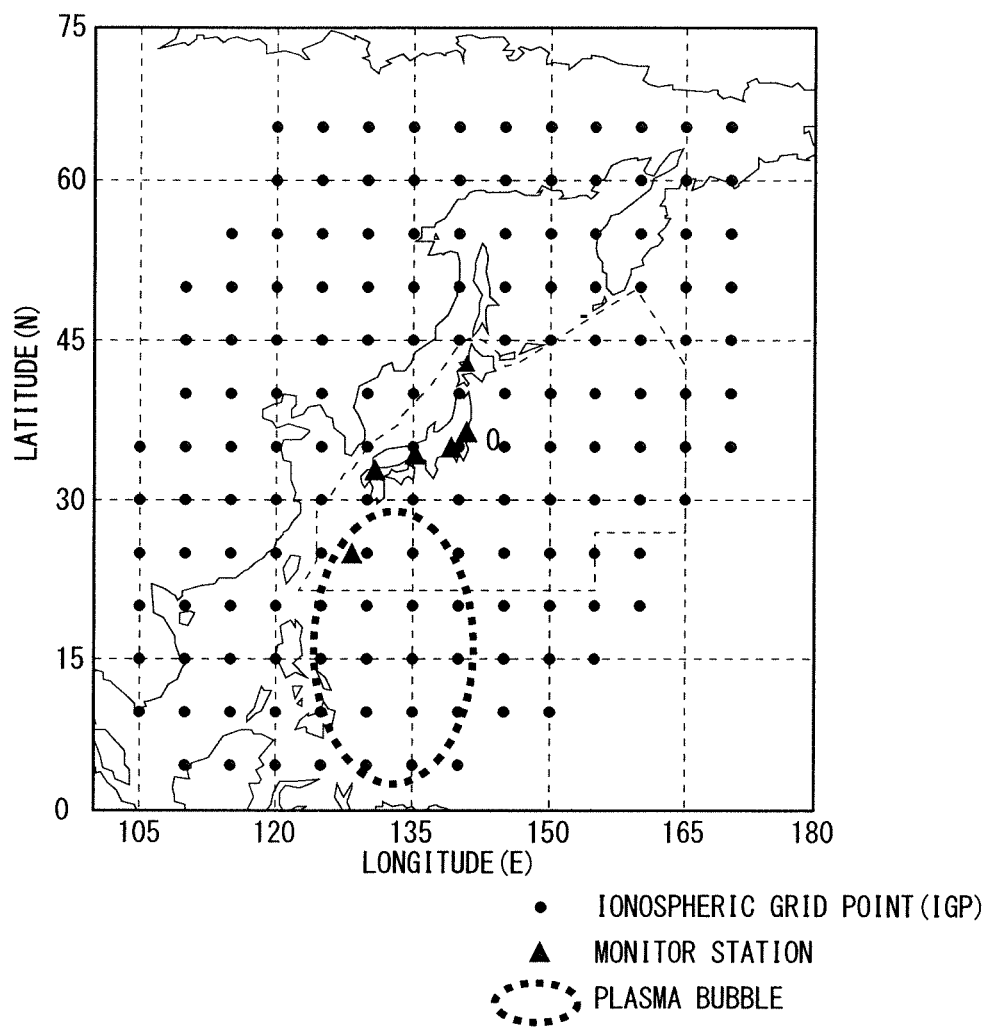
FIG. 39 is a diagram illustrating a low-latitude area in the south of Japan, where precision of ionospheric propagation delay of a positioning reinforcing signal is reduced.

Further, as illustrated in FIG. 39, in a case where a subject vehicle is present in a low-latitude area in the south of Japan, the ionosphere is unstable due to the solar activity or the like (a phenomenon in which plasma density is locally decreased is called plasma bubbles), which may reduce precision of ionospheric propagation delay of a positioning reinforcing signal from SBAS. Concerning a plurality of GNSS satellites, in a case where a difference between a change amount of a pseudorange and a range rate is detected to be deviated by a predetermined value or more for a long cycle, the ionospheric state may be determined to be unstable. Therefore, in a case where the ionospheric state is determined to be unstable, the pseudorange correction part 103 may detect, in each GNSS satellite, an unknown error unique to a satellite that is obtained by eliminating a receiver clock error common to receiving channels of the GNSS receiver 10 (common to GNSS satellites) from unknown errors contained in each pseudorange of GNSS satellites under open sky, regarding a part matching with the difference between the change amount of a pseudorange and the range rate as a residual of an ionospheric propagation delay error. With this, the first corrected pseudorange can be calculated distinguishing a receiver clock error common to GNSS satellites from an ionospheric propagation delay error that is different in every GNSS satellite, which enables highly precise determination with stable precision of a subject vehicle position and a receiver clock.

Note that, in the present invention, each of the embodiments may be freely combined, and each of the embodiments may be modified or omitted as appropriate within the scope of the invention.

The present invention has been described in detail, but the above description is in all aspects illustrative, and the present invention is not to be limited thereto. It is understood that innumerable unillustrated modified examples are assumable without departing from the scope of the present invention.

EXPLANATION OF REFERENCE SIGNS

10 GNSS receiver, 100 positioning part, 101 data conversion part, 102 GNSS satellite behavior estimation part, 103 pseudorange correction part, 104 code positioning part, 105 pseudorange prediction part, 106 reliability evaluation part, 107 receiver clock bias error correction part, 108 code positioning correction part, 109 carrier wave phase prediction part, 110 receiver clock drift error detection part, 111 carrier wave phase calculation part, 112 carrier wave phase positioning part, 113 carrier wave phase complex positioning part, 114 velocity sensor, 115 distance measurement part, 116 velocity sensor SF correction part, 117 angular velocity sensor, 118 yaw angle measurement part, 119 angular velocity sensor correction part, 120 autonomous navigation part, 121 map information acquisition part, 122 lane map matching part

The invention claimed is:

1. A positioning device for measuring a position of a mobile object, the positioning device comprising:
a processor to execute a program; and
a memory to store the program which, when executed by the processor, performs processes of,
calculating a position of the mobile object and a receiver clock based on an orbit of a GNSS satellite in which an error indicated by a positioning reinforcing signal is corrected and a first corrected pseudorange being a pseudorange of the GNSS satellite in which an error indicated by the positioning reinforcing signal is corrected,
determining, concerning a plurality of GNSS satellites affected by multipath to a smaller extent than a predetermined value, a difference between a two-point range between a position of each of the plurality of GNSS satellites and the position of the mobile object and the first corrected pseudorange as an unknown error, and determining a receiver clock bias error of the pseudorange based on the unknown error, and recalculating the position of the mobile object, using a second corrected pseudorange that is obtained by correcting the first corrected pseudorange using the receiver clock bias error.

2. The positioning device according to claim 1, wherein the processor determines a mean value or a median of the unknown error as the receiver clock bias error.

3. The positioning device according to claim 1, wherein the processor calculates a predicted value of the first corrected pseudorange by predicting a waveform of the first corrected pseudorange through polynomial approximation calculation, and
the processor determines a difference between the two-point range between the position of each of the plurality of GNSS satellites and the position of the mobile object and the predicted value of the first corrected pseudorange as the unknown error.

4. The positioning device according to claim 3, wherein, in a case where a difference between the first corrected pseudorange and the predicted value of the first corrected pseudorange is larger than a predetermined value, the processor obtains the second corrected pseudorange by correcting the predicted value of the first corrected pseudorange instead of correcting the first corrected pseudorange.

5. The positioning device according to claim 3, wherein, when a step change occurs in the waveform of the first corrected pseudorange along with correction of the receiver clock bias error in a GNSS receiver, the processor corrects the waveform of the first corrected pseudorange into a continuous waveform based on magnitude of the step change, and then calculates the predicted value of the first corrected pseudorange.

6. The positioning device according to claim 3, wherein the processor predicts a range rate of a GNSS satellite concerning a GNSS satellite from which a navigation message has been acquired,
the processor detects a receiver clock drift error from a difference between a predicted value and an observed value of the range rate of the GNSS satellite,
the processor calculates a carrier wave phase by integrating the range rate of the GNSS satellite, and calculates a carrier wave phase bias of the carrier wave phase,
the processor calculates the position of the mobile object using a value corresponding to a pseudorange calculated from the carrier wave phase, the carrier wave phase bias, the error indicated by the positioning reinforcing signal, and the receiver clock bias error,
the processor integrates the observed value of the range rate when the processor receives a radio wave from the GNSS satellite, and integrates a value obtained by adding the receiver clock drift error to the predicted value of the range rate when the processor does not receive a radio wave, to thereby calculate the carrier wave phase, and
when difference between the two-point range between the position of the GNSS satellite and the position of the mobile object and a pseudorange in which the error indicated by the positioning reinforcing signal and the receiver clock bias error are corrected is a predetermined value or less, the processor determines the carrier wave phase bias from the pseudorange and the carrier wave phase of each GNSS satellite and the error indicated by the positioning reinforcing signal.

7. The positioning device according to claim 6, wherein when a satellite radio wave from the GNSS satellite is interrupted to be brought into a non-positioning state, the processor predicts a position and velocity of the mobile object during the non-positioning from transition of the position of the mobile object during positioning, predicts the receiver clock bias error and the receiver clock drift error during the non-positioning from transition of the receiver clock bias error during positioning, and predicts a range rate of the GNSS satellite from which a navigation message has been acquired during the non-positioning and integrates the range rate, and when a satellite radio wave is then received and positioning is restarted, the processor validates the integrated value of the range rate predicted during the non-positioning and continues the integration of the range rate in a case where such a condition is satisfied that the position and the velocity of the mobile object predicted during the non-positioning fall within a certain range with reference to a position and velocity of the mobile object that are obtained immediately after positioning is restarted and that the receiver clock bias error predicted during the non-positioning falls within a certain range with reference to a receiver clock bias error that is obtained immediately after positioning is restarted, and the processor invalidates the integrated value of the range rate predicted during the non-positioning and initializes the integration of the range rate in a case where the condition fails to be satisfied.

8. The positioning device according to claim 6, wherein the processor calculates one receiver clock error converted such that the receiver clock bias error and the receiver clock drift error match with each other.

9. The positioning device according to claim 1, wherein the mobile object comprises a vehicle,
the processor calculates a movement distance of the vehicle from an output of a velocity sensor of the vehicle,
the processor calculates a yaw angle of the vehicle from an output of an angular velocity sensor of the vehicle,
the processor updates a position and an azimuth of the vehicle with autonomous navigation using the movement distance and the yaw angle of the vehicle, and
the processor corrects the position of the vehicle determined by autonomous navigation based on satellite positioning using a GNSS satellite.

10. The positioning device according to claim 9, wherein the processor determines a traveling lane of the vehicle using the position of the vehicle determined by satellite positioning or by autonomous navigation and map information,
the processor corrects an error of an output bias of the angular velocity sensor, and
the processor corrects the error of the output bias of the angular velocity sensor such that the position of the vehicle determined by autonomous navigation is updated to be a position falling within a traveling lane of the vehicle.

11. The positioning device according to claim 10, wherein the processor determines lane change of the vehicle using the position of the vehicle determined by autonomous navigation, and when the vehicle changes lanes, the processor corrects the position and the azimuth of the subject vehicle determined by autonomous navigation such that the position of the vehicle determined by autonomous navigation falls within any of a traveling lane before lane change and a traveling lane after lane change, and the processor corrects the error of the output bias of the angular velocity sensor such that the position of the vehicle determined by autonomous navigation falls within any of a traveling lane before lane change and a traveling lane after lane change.

12. The positioning device according to claim 10, wherein, when the vehicle travels in an area having low map precision, the processor learns a constant difference generated between the position of the vehicle determined by autonomous navigation and the position of the vehicle determined by satellite positioning to perform map matching processing.

13. The positioning device according to claim 10, wherein, when the vehicle travels in an area where map information is not updated for a certain period of time of more, the processor learns a constant difference generated between the position of the vehicle determined by autonomous navigation and the position of the vehicle determined by satellite positioning to perform map matching processing.

14. The positioning device according to claim 1, wherein, in a case where an ionospheric state is unstable when the processor determines whether or not the ionospheric state is stable, the processor detects a residual in each of a plurality of GNSS satellites as a residual of an ionospheric propagation delay error, the residual being obtained by eliminating an error common to the plurality of GNSS satellites from a pseudorange of each of the plurality of GNSS satellites.

15. The positioning device according to claim 9, wherein the processor confirms in advance a deviation amount of positioning results to be generated when a part of GNSS satellites being used for positioning is eliminated, and in a case where the part of the GNSS satellites is incapable of actual use, the processor calculates an error of the position of the vehicle determined by satellite positioning based on the confirmed deviation amount.

16. The positioning device according to claim 9, wherein the processor switches a complex positioning mode from a tight coupling mode to a loose coupling mode in a case where deviation is generated in the position of the vehicle determined by satellite positioning due to arrangement of GNSS satellites.

17. A positioning method of measuring a position of a mobile object, the positioning method comprising:
calculating a position of the mobile object and a receiver clock based on an orbit of a GNSS satellite in which an error indicated by a positioning reinforcing signal is corrected and a first corrected pseudorange being a pseudorange of the GNSS satellite in which an error indicated by the positioning reinforcing signal is corrected;
determining, concerning a plurality of GNSS satellites affected by multipath to a smaller extent than a predetermined value, a difference between a two-point range between a position of each of the plurality of GNSS satellite and the position of the mobile object and the first corrected pseudorange as an unknown error, and calculating a receiver clock bias error of the pseudorange based on the unknown error; and
recalculating the position of the mobile object, using a second corrected pseudorange that is obtained by correcting the first corrected pseudorange using the calculated receiver clock bias error.

* * * * *